(12) United States Patent
Joo et al.

(10) Patent No.: US 9,291,861 B2
(45) Date of Patent: Mar. 22, 2016

(54) LIQUID CRYSTAL DISPLAY

(75) Inventors: Sun-Kyu Joo, Suwon-si (KR); Sam Jin Hwang, Yongin-si (KR); Ju Hyeon Baek, Asan-si (KR); Ji Young Jeong, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 13/481,446

(22) Filed: May 25, 2012

(65) Prior Publication Data

US 2012/0314163 A1 Dec. 13, 2012

(30) Foreign Application Priority Data

Jun. 8, 2011 (KR) .......................... 10-2011-0055111

(51) Int. Cl.
*G02F 1/1339* (2006.01)
*G02F 1/1335* (2006.01)

(52) U.S. Cl.
CPC ...... *G02F 1/13394* (2013.01); *G02F 1/133514* (2013.01); *G02F 2001/13396* (2013.01)

(58) Field of Classification Search
CPC .................. G02F 1/13394; G02F 2001/13396
USPC .......................................................... 349/155
See application file for complete search history.

(56) References Cited

U.S. PATENT DOCUMENTS

| 6,678,030 | B2 | 1/2004 | Imabayashi et al. | |
|---|---|---|---|---|
| 6,705,584 | B2 | 3/2004 | Hiroshima et al. | |
| 7,742,131 | B2 | 6/2010 | Tsai et al. | |
| 7,773,190 | B2 | 8/2010 | Kwak et al. | |
| 7,826,028 | B2 | 11/2010 | Shimizu et al. | |
| 7,859,635 | B2 | 12/2010 | Yokoyama et al. | |
| 2001/0026347 | A1* | 10/2001 | Sawasaki et al. ............. | 349/156 |
| 2007/0058126 | A1* | 3/2007 | Cho et al. ...................... | 349/156 |
| 2009/0073371 | A1* | 3/2009 | Takeda et al. ................. | 349/156 |
| 2009/0273747 | A1* | 11/2009 | Shin et al. ..................... | 349/107 |
| 2010/0060842 | A1* | 3/2010 | Igeta et al. .................... | 349/153 |
| 2010/0091234 | A1* | 4/2010 | Nakahata et al. ............. | 349/155 |

FOREIGN PATENT DOCUMENTS

| CN | 101846854 | 9/2010 |
|---|---|---|
| JP | 4301741 | 9/2002 |
| JP | 4276988 | 5/2005 |
| JP | 2007-171715 | 7/2007 |
| JP | 2007-171716 | 7/2007 |
| JP | 2007-232839 | 9/2007 |

(Continued)

*Primary Examiner* — Paisley L Arendt
*Assistant Examiner* — Edmond Lau
(74) *Attorney, Agent, or Firm* — H.C. Park & Associates, PLC

(57) ABSTRACT

According to exemplary embodiments of the invention, a liquid crystal display is provided which includes a plurality of spacers having different heights or a different distance or different pressure tolerance from a corresponding display panel and disposed in at least two pixel areas displaying different colors. As compared with conventional techniques (e.g., disposing the spacers only in one pixel area), the disposition density of the spacer per pixel area is lowered, such that it is possible to prevent the pressure tolerance of the spacer from intensively acting only on a specific pixel. The pressure tolerance of the spacer is uniformly maintained for every pixel, so that insufficiency of the amount of dropping liquid crystal is avoided. As a result, it is possible to prevent the light leakage caused by the insufficient liquid crystal.

29 Claims, 22 Drawing Sheets

(56) References Cited

FOREIGN PATENT DOCUMENTS

| | | |
|---|---|---|
| JP | 2008-309857 | 12/2008 |
| JP | 2009-150916 | 7/2009 |
| KR | 10-0919193 | 7/2004 |
| KR | 10-2006-0057196 | 5/2006 |
| KR | 10-2007-0038852 | 4/2007 |
| KR | 10-2007-0079613 | 8/2007 |
| KR | 10-0949506 | 1/2008 |
| KR | 10-2008-0029397 | 4/2008 |
| KR | 10-2008-0039036 | 5/2008 |
| KR | 10-2008-0081674 | 9/2008 |
| KR | 10-2008-0091909 | 10/2008 |
| KR | 10-2009-0060159 | 6/2009 |

\* cited by examiner

LIQUID CRYSTAL DISPLAY

CROSS REFERENCE TO RELATED APPLICATION

This application claims priority from and the benefit of Korean Patent Application No. 10-2011-0055111 filed on Jun. 8, 2011, which is hereby incorporated by reference for all purposes as if fully set forth herein.

BACKGROUND OF THE INVENTION

1. Field of the Invention

Exemplary embodiments of the present invention relate to a liquid crystal display.

2. Discussion of the Background

The liquid crystal display is one of the most widely used flat panel displays. This type of display device may comprise of two display panels with electric field generating electrodes formed therein and a liquid crystal layer formed therebetween. The transmittance of light which passes through the liquid crystal layer is controlled by applying voltage to the electrodes to change the alignment of the liquid crystal molecules of the liquid crystal layer.

An upper panel and a lower panel of the liquid crystal display are supported by a spacer disposed between the two panels to maintain a cell gap therebetween.

Generally, in case of a liquid crystal display formed by a liquid crystal dropping method, liquid crystal is dropped to be formed one of two panels and a sealing line enclosing the peripherals of the display area is formed on the other panel in which a column spacer is formed. Thereafter, the upper panel and the lower panel are attached to each other.

The cross-sectional area and density of the spacer of this liquid crystal panel may influence the pressure tolerance of the spacer and liquid crystal dropping margin. Pressure tolerance refers to a degree of supporting a predetermined intensity of pressure. The larger pressure tolerance refers to the larger degree of supporting a larger pressure.

If the pressure tolerance of the spacer is low, the spacer may be squashed and may not maintain a constant cell gap, which may cause a smear problem. In order to prevent the smear problem, the pressure tolerance of the spacer may be increased. However, if the density of the spacer is increased, the compressive strain of the spacer may be decreased. When the compressive strain of the spacer is decreased, the liquid crystal dropping margin is also decreased. Further, it is hard to control the amount of dropping liquid crystal, and the amount of liquid crystal may be insufficient. As a result, an empty space between the upper panel and the lower panel which is not filled with the liquid crystal may be formed, which results in the light leakage.

Generally, a main spacer that maintains a cell gap between the upper display panel and the lower display panel may be disposed in a pixel area which displays a predetermined color at least affecting the light transmittance of the liquid crystal display, and another sub spacer having different pressure tolerance from the main spacer may be disposed in all pixels.

In this case, in the pixel area of a predetermined color in which the main spacer may be disposed, the pressure tolerance of the spacer becomes much bigger than pixel areas of other colors. Therefore, the amount of dropping liquid crystal may be insufficient.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention provide a liquid crystal display which is capable of preventing the light leakage due to the insufficient liquid crystal by maintaining constantly the pressure tolerance of the spacer to prevent the amount of dropping liquid crystal from being deficient.

Additional features of the invention will be set forth in the description which follows, and in part will be apparent from the description, or may be learned by practice of the invention.

Exemplary embodiments of the present invention disclose a liquid crystal display including a first substrate and a second substrate facing each other; a plurality of color filters disposed on the second substrate and configured to filter different wavelengths corresponding to colors; and a first spacer and a second spacer disposed on the second substrate and have a different distance from the upper surface of the plurality of thin films disposed on the first substrate or a different width or cross-sectional area. In this case, the first spacer may be disposed in a position to overlap each of at least two color filters that are configured to filter different wavelengths from each other, and the second spacer is disposed in a position to overlap each of at least two color filters disposed on a light blocking member.

The height of the first spacer may be different from the height of the second spacer.

The height of the plurality of thin films formed on the first substrate corresponding to the first spacer may be different from the height of the plurality of thin films formed on the first substrate corresponding to the second spacer.

The height of the first spacer may be substantially equal to the height of the second spacer.

The height of the first spacer may be different from the height of the second spacer.

The liquid crystal display may further include a third spacer that is formed on the second substrate, the distance between the third spacer and the upper surface of the plurality of thin films formed on the first substrate being different from that of the first spacer and the second spacer.

The third spacer may be disposed in a position to overlap each of at least two color filters displaying different colors of the plurality of color filters.

The distance between the first spacer and the upper surface of the plurality of thin films formed on the first substrate may be narrower than the distance between the second spacer and the upper surface of the plurality of thin films formed on the first substrate. Further, the distance between the second spacer and the upper surface of the plurality of thin films formed on the first substrate may be narrower than the distance between the third spacer and the upper surface of the plurality of thin films formed on the first substrate. Furthermore, the difference in the distance between the third spacer and the upper surface of the plurality of thin films formed on the first substrate and the distance between the first spacer and the upper surface of the plurality of thin films formed on the first substrate may be approximately 0.6 μm to 1.5 μm.

The liquid crystal display may further include a third spacer that is disposed on the second substrate, the third spacer having almost the same height as the second spacer, and a different width or cross-sectional area from the second spacer.

The third spacer may be disposed in a position to overlap each of at least two color filters displaying different colors of the plurality of color filters.

The first spacer and the second spacer may have different cross-sectional shapes.

The liquid crystal display may further include a third spacer that is disposed on the second substrate, the third spacer having a different cross-sectional area from the first spacer and the second spacer.

The height of the third spacer may be substantially equal to the height of the second spacer.

Exemplary embodiments of the present invention also disclose a liquid crystal display including a first substrate and a second substrate facing each other; a first color filter, a second color filter, and a third color filter disposed on the second substrate configured to filter different wavelengths corresponding to colors. The liquid crystal display also include a first spacer and a second spacer that are disposed on the second substrate and have a different gap from the upper surface of the plurality of thin films disposed on the first substrate or a different width or cross-sectional shape. In this case, the first spacer and the second spacer may be disposed in at least two positions of a position overlapping the first color filter and the second color filter, a position overlapping the second color filter and the third color filter, and a position overlapping the third color filter and the first color filter.

The liquid crystal display may further include a third spacer that is formed on the second substrate, the distance between the third spacer and the upper surface of the plurality of thin films formed on the first substrate being different from that of the first spacer and the second spacer. The third spacer may be disposed in at least two positions of a position overlapping the first color filter and the second color filter, a position overlapping the second color filter and the third color filter, and a position overlapping the third color filter and the first color filter.

The liquid crystal display may further include a third spacer that is disposed on the second substrate, the third spacer having almost the same height as the second spacer, and a different width or cross-sectional area from the second spacer. The third spacer may be disposed in at least two positions of a position overlapping the first color filter and the second color filter, a position overlapping the second color filter and the third color filter, and a position overlapping the third color filter and the first color filter.

The first spacer and the second spacer may be disposed in at least two positions of a position overlapping the first color filter and the second color filter and a light blocking member between the first color filter and the second color filter, a position overlapping the second color filter and the third color filter and a light blocking member between the second color filter and the third color filter, and a position overlapping the third color filter and the first color filter and a light blocking member between the third color filter and the first color filter.

The first spacer and the second spacer may have different cross-sectional shapes.

The liquid crystal display may further include a third spacer that is disposed on the second substrate, the third spacer having a different cross-sectional area from the first spacer and the second spacer.

The height of the third spacer may be substantially equal to the height of the second spacer.

The third spacer may be disposed in at least two positions of a position overlapping the first color filter and the second color filter, a position overlapping the second color filter and the third color filter, and a position overlapping the third color filter and the first color filter.

As described above, the liquid crystal display according to the exemplary embodiment of the present invention disposes the plurality of spacers having different pressure tolerances in at least two pixel areas displaying different colors. Therefore, the pressure tolerance of the spacer is uniformly maintained for every pixel, so that insufficiency of the amount of dropping liquid crystal is avoided. As a result, it is possible to prevent the light leakage caused by the insufficient liquid crystal.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention

DETAILED DESCRIPTION OF THE ILLUSTRATED EMBODIMENTS

Figure 1:
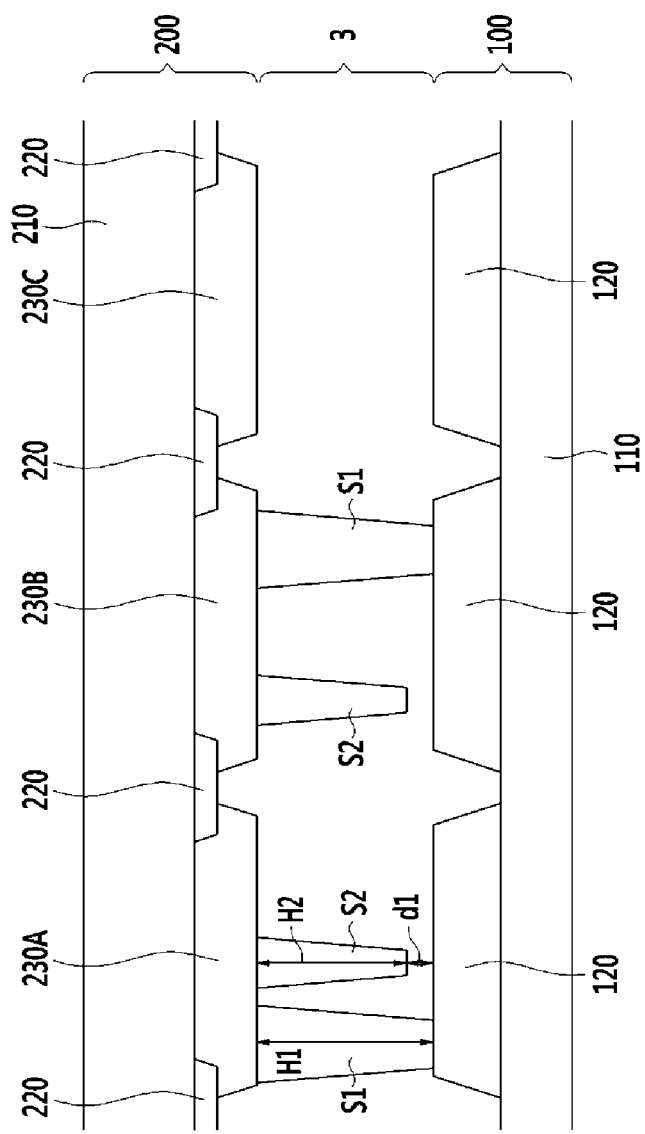
FIG. 1 is a schematic cross-sectional view of a liquid crystal display according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element such as a layer, film, region, or substrate is referred to as being "on" another element, it can be directly on the other element or intervening elements may also be present. In contrast, when an element is referred to as being "directly on" another element, there are no intervening elements or layers present.

It will be understood that, although the terms first, second, third etc. may be used herein to describe various elements, components, regions, layers and or sections, these elements, components, regions, layers and or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing exemplary embodiments only, and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It should be understood that for the purposes of this disclosure, "at least one of X, Y, and Z" can be construed as X only, Y only, Z only, or any combination of two or more items X, Y, and Z (e.g., XYZ, XYY, YZ, ZZ).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning. For example consistent with their meaning in the context of the relevant art and will not be interpreted in an idealized or overly formal sense unless expressly so defined herein.

A liquid crystal display according to exemplary embodiments of the present invention will be described hereinafter with reference to the accompanying drawings.

Referring to FIG. 1, a liquid crystal display according to exemplary embodiments of the present invention will be described. FIG. 1 is a schematic cross-sectional view of the liquid crystal display according to exemplary embodiments of the present invention.

The liquid crystal display according to the exemplary embodiments of the present invention may include a first display panel 100 and a second display panel 200 may face each other and a liquid crystal layer 3 may be injected between the two display panels 100 and 200.

The first display panel 100 may include a first substrate 110 and a plurality of thin film layers 120 may be disposed on the first substrate 110.

The second display panel 200 may include a second substrate 210, a light blocking member 220 may be disposed on the second substrate 210, and a plurality of color filters 230A, 230B, and 230C may be disposed on the light blocking member 220 and may display different colors. The color filters may filter light at different wavelengths corresponding to primary colors. Examples of the primary colors may include primary colors such as red, green, and blue, or yellow, cyan, or magenta. Although not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2, having different distances from the plurality of thin film layers 120 of the first display panel 100 which face the spacers.

The first spacer S1 may contact both the first display panel 100 and the second display panel 200 and the cell gap of the liquid crystal display may be maintained by the first spacer S1. The second spacer S2 may be spaced apart from the corresponding first display panel 100 by a predetermined distance d1 and may serve to maintain the cell gap of the liquid crystal display when a force with a larger pressure than the pressure tolerance of the first spacer S1 may be applied to the liquid crystal display. The second spacer S2 may have higher disposition density per pixel area than the first spacer S1.

The plurality of first spacers S1 may be disposed in a position which may correspond to each of at least two color filters 230A and 230B of the plurality of color filters 230A, 230B, and 230C filtering light at different wavelengths corresponding to different colors. The plurality of second spacers S2 may be disposed in a position which may correspond to each of at least two color filters 230A and 230B of the plurality of color filters 230A, 230B, and 230C. The color filters 230A, which overlap the first spacer S1 and the second spacer S2 may have different heights.

The height of the first spacer S1 may be different from the height of the second spacer S2. The height H1 of the first spacer S1 may be larger than the height H2 of the second spacer S2. The first spacer S1 and the second spacer S2 may be disposed to correspond to the position where the plurality of thin film layers 120 of the corresponding first display panel 100 may have the same height. Therefore, due to the different height of the first spacer S1 and the second spacer S2, the distance from the first spacer S1 to the corresponding first display panel 100 may be different from the distance from the second spacer S2 to the corresponding first display panel 100.

Although not shown in the drawings, a third spacer may have a larger distance to the corresponding first display panel 100 than that of the first spacer S1 and the second spacer S2 may further be provided. The third spacer may be disposed in a position which may overlap with each of at least two color filters of the plurality of color filters 230A, 230B, and 230C. The third spacer may have a higher disposition density per pixel area than the first spacer S1 or the second spacer S2.

However, the third spacer may have almost the same height as the second spacer S2, but may have a different width or cross-sectional area from the second spacer S2.

The first spacer, the second spacer, and the third spacer may have different disposition density. An area of the uppermost part of the first spacer S1, may be approximately 3.40% to 6.17% with respect to the area of the uppermost part occupied by the entire spacers. The uppermost part may refer to a surface which may be closest to a substrate opposite to a substrate on which the first spacer S1 is located. The area of the uppermost part of the second spacer S2 may be approximately 4.44% to 9.02% with respect to the area of the uppermost part occupied by the entire spacers. The area of the uppermost part of the third spacer may be approximately 89.70% to 96.63% with respect to the area of the uppermost part occupied by the entire spacers.

Further, as the size of the liquid crystal display is increased, the disposition density of the first spacer may be relatively decreased, and the disposition density of the third spacer may be relatively increased.

A difference of height between the first spacer S1, whose distance from the corresponding first display panel 100 is the least, specifically, almost 0, and the third spacer, whose distance from the corresponding first display panel 100 is the largest may be at most 0.6 µm to 1.5 µm. Further, the difference of height between the first spacer S1 and the second spacer S2 and the difference of height between the second spacer S2 and the third spacer can be appropriately selected according to the liquid crystal display. For example, the difference of height between the first spacer S1 and the second spacer S2 may be approximately 0.3 µm to 0.7 µm and the difference of height between the second spacer S2 and the third spacer may be approximately 0.3 µm to 0.7 µm.

In the exemplary embodiments, although the widths of the first spacer S1 and the second spacer S2 may differ from each other, the widths of the first spacer S1 and the second spacer S2 may be equal to each other.

According to another exemplary embodiment of the present invention, the first spacer S1 may be disposed in a position which may correspond to two color filters of a plurality of color filters that filter light at different wavelengths corresponding to a display of different colors, and the second spacer S2 may be disposed in a position corresponding to one of a plurality of color filters may display different colors.

In the liquid crystal display according to the exemplary embodiments of the present invention, the spacers S1 and S2 may be disposed on the second display panel 200. However, in the liquid crystal display according to another exemplary embodiment of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, according to the liquid crystal display of the exemplary embodiments of the present invention, the first spacer and the second spacer may be disposed in the plurality of pixel areas. Therefore, as compared with the conventional liquid crystal display in which the first and second spacers may be disposed only in one pixel area, the disposition density of the spacer per pixel area may be lowered, which may prevent the pressure tolerance of the spacer from largely acting only on a specific pixel. As a result, the pressure tolerance of the spacers may uniformly be maintained for every pixel and may prevent the amount of dropping liquid crystal from being insufficient, and may prevent the light leakage may be caused by the insufficient liquid crystal.

Figure 2:
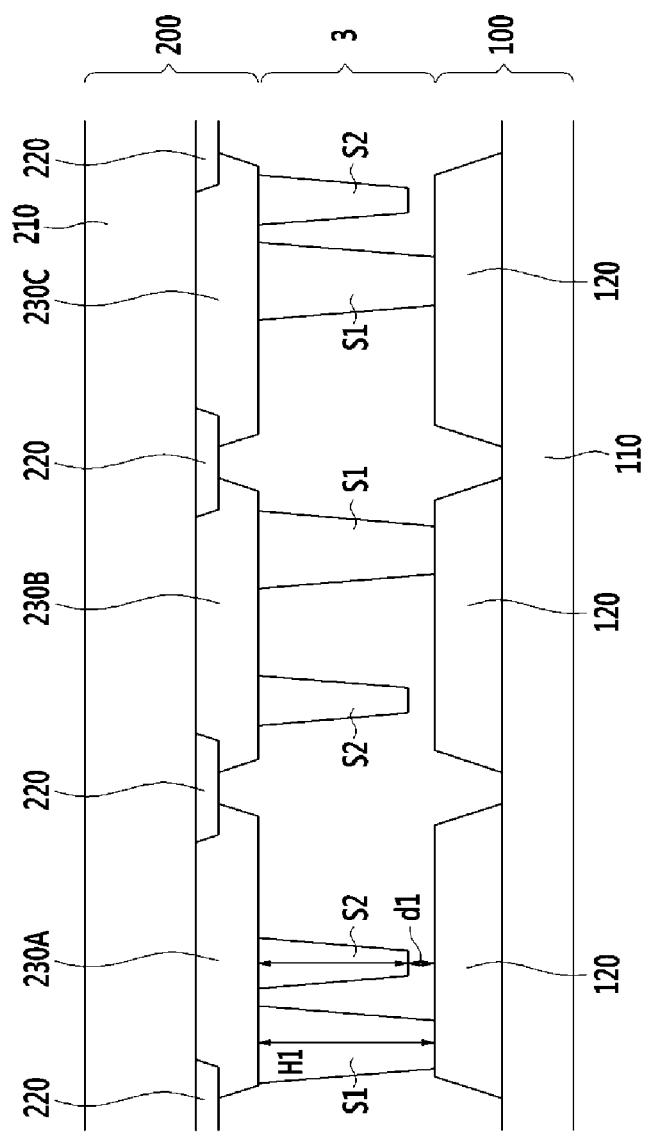
FIG. 2 is a schematic cross-sectional view of a liquid crystal display according to exemplary embodiments of the present invention.

Referring to FIG. 2, the liquid crystal display according to another exemplary embodiment of the present invention will be described. FIG. 2 is a schematic cross-sectional view of a liquid crystal display according to exemplary embodiments of the present invention.

The liquid crystal display according to the exemplary embodiments of the present invention may have similar structure to the liquid crystal display of the above-described exemplary embodiment of FIG. 1.

The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers 120 which may be disposed on the first substrate 110.

The second display panel 200 may include a second substrate 210, a light blocking member 220 may be disposed on the second substrate 210, and a plurality of color filters 230A, 230B, and 230C may be disposed on the light blocking member 220 and may filter light at different wavelengths corresponding to a display of different colors. The color filters may display one of the primary colors. Examples of the primary colors include but are not limited to primary colors such as red, green, and blue, or yellow, cyan, or magenta. Although not shown in the drawings, the color filter may further include color filters displaying a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 may have different distances from the plurality of thin film layers 120 of the first display panel 100.

The first spacer S1 may contact both the first display panel 100 and the second display panel 200 and the cell gap of the liquid crystal display may be maintained by the first spacer S1. The second spacer S2 may be spaced apart from the corresponding first display panel 100 with a predetermined distance d1 and may serve to maintain the cell gap of the liquid crystal display when a force with a larger pressure than the pressure tolerance of the first spacer S1 may be applied to the liquid crystal display. The second spacer S2 may have a higher disposition density per pixel area than the first spacer S1.

The first spacer S1 and the second spacer S2 are disposed in a position corresponding to each of the plurality of color filters 230A, 230B, and 230C filtering light at different wavelengths corresponding to different colors. The color filters 230A, 230B, and 230C that the first spacer S1 and the second spacer S2 overlap may have different heights.

The height of the first spacer S1 may be different from the height of the second spacer S2. The height H1 of the first spacer S1 may be larger than the height H2 of the second spacer S2. The first spacer S1 and the second spacer S2 may be disposed so as to correspond to the position where the plurality of thin film layers 120 of the corresponding first display panel 100 may have the same height. Therefore, due to the different height of the first spacer S1 and the second spacer S2, the distance from the first spacer S1 to the corresponding first display panel 100 may differ from the distance from the second spacer S2 to the corresponding first display panel 100.

Although not shown in the drawings, a third spacer having a larger distance to the corresponding first display panel 100 than that of the first spacer S1 and the second spacer S2 may be further be provided, and the third spacer may also be disposed in a position overlapping with each of at least two color filters of the plurality of color filters 230A, 230B, and 230C. The third spacer may have higher disposition density per pixel area than the first spacer S1 or the second spacer S2.

The third spacer may have almost the same height as the second spacer S2, but may have a different width or cross-sectional area from the second spacer S2.

The first spacer, the second spacer, and the third spacer may have different disposition density. The area of a surface of the uppermost part of the first spacer S1 may be approximately 3.40 to 6.17% with respect to the area of the uppermost part occupied by the entire spacers. The uppermost part may refer to a surface which may be closest to a substrate corresponding to a substrate on which the first spacer S1 is located. The area of the uppermost part of the second spacer S2 may be approximately 4.44 to 9.02% with respect to the area of the uppermost part occupied by the entire spacers. The area of the uppermost part of the third spacer may be approximately 89.70 to 96.63% with respect to the area of the uppermost part occupied by the entire spacers.

Further, as the size of the liquid crystal display increases, the disposition density of the first spacer may be relatively decreased, and the disposition density of the third spacer may be relatively increased.

A difference of height between the first spacer S1 whose, distance from the corresponding first display panel 100 may be the least almost 0, and the third spacer, whose distance from the corresponding first display panel 100 may be at most 0.6 μm to 1.5 μm. Further, the difference of height between the first spacer S1 and the second spacer S2 and the difference of height between the second spacer S2 and the third spacer may appropriately be selected according to the liquid crystal display. For example, the difference of height between the first spacer S1 and the second spacer S2 may be approximately 0.3 μm to 0.7 μm and the difference of height between the second spacer S2 and the third spacer may be approximately 0.3 μm to 0.7 μm.

Although the widths of the first spacer S1 and the second spacer S2 may be different from each other, the widths of the first spacer S1 and the second spacer S2 may be equal to each other.

In the liquid crystal display according to the exemplary embodiments of the present invention, the spacers S1 and S2 may be disposed on the second display panel 200. However, in some cases, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, the first spacer S1 and the second spacer S2 may be disposed in the plurality of pixel areas. Therefore, as compared with the conventional liquid crystal display in which the first and second spacers may be disposed only in one pixel area, the disposition density of the spacer per pixel area may be lowered, which may prevent the pressure tolerance of the spacer from largely acting only on a specific pixel. As a result, the pressure tolerance of the spacers may uniformly be maintained for every pixel and may prevent the amount of dropping liquid crystal from being insufficient, and may prevent the light leakage may be caused by the insufficient liquid crystal.

Figure 3:
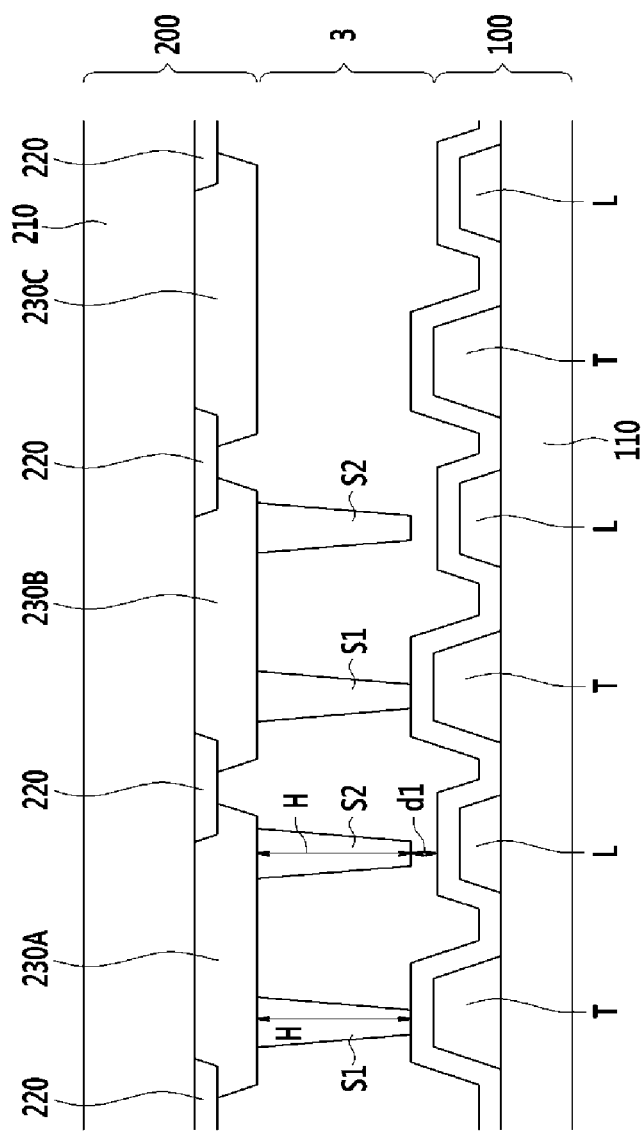
FIG. 3 is a schematic cross-sectional view of a liquid crystal display according to exemplary embodiments of the present invention.

Referring to FIG. 3, the liquid crystal display according to exemplary embodiments of the present invention will be described. FIG. 3 is a schematic cross-sectional view of a liquid crystal display according to exemplary embodiments of the present invention.

The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers may be disposed on the first substrate 110. The plurality of thin film layers may include T parts on which thin film transistors may be disposed, and L parts on which signal lines may be disposed. The height of T parts on which thin film transistors may be disposed may be larger than the height of L parts on which signal lines may be disposed.

The exemplary embodiments describe that the height of each part is varied depending on the types of thin film included in the plurality of thin film layers. However, the height of the plurality of thin film layers can be adjusted by various ways such as the arrangement of an organic layer or formation of grooves according to the position. Therefore, the plurality of thin film layers of the first display panel 100 of the liquid crystal display according to another exemplary embodiment of the present invention may have different heights depending on the arrangement of an organic layer or formation of grooves according to the position.

The second display panel 200 may include a second substrate 210, a light blocking member 220 disposed on the second substrate 210, and a plurality of color filters 230A, 230B, and 230C disposed on the light blocking member 220 and filter light at different wavelengths corresponding to a display of different colors. The color filters may display one of the primary colors. Examples of the primary colors may include primary colors such as red, green, and blue, or yellow, cyan, or magenta. Although not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different distances from the plurality of thin film layers of the first display panel 100 which face the spacers.

The plurality of first spacers S1 may be disposed in a position corresponding to each of at least two color filters 230A and 230B of the plurality of color filters 230A, 230B, and 230C. The plurality of second spacers S2 may be disposed in a position corresponding to each of at least two color filters 230A and 230B of the plurality of color filters 230A, 230B, and 230C. The two color filters 230A and 230B that overlap the first spacer S1 and the second spacer S2 may have different heights.

The first spacer S1 may contact both the first display panel 100 and the second display panel 200 so that the cell gap of the liquid crystal display may be maintained by the first spacer S1. The second spacer S2 may be spaced apart from the first display panel 100 by a predetermined distance d1 and may serve to maintain the cell gap of the liquid crystal display when a force with a larger pressure than the pressure tolerance of the first spacer S1 may be applied to the liquid crystal display. The second spacer S2 may have a higher disposition density per pixel area than the first spacer S1.

The first spacer S1 and the second spacer S2 may have almost the same height H. However, the first spacer S1 may be disposed in a position which may correspond to a higher part of the plurality of thin film layers of the first display panel 100, (e.g., the T parts in which thin film transistors are disposed), and the second spacer S2 may be disposed in a position which may correspond to a lower part of the plurality of thin film layers of the first display panel 100, (e.g., the L parts on which signal lines may be disposed). Therefore, the two spacers S1 and S2, which may have the same height, may have different distances from the corresponding first display panel 100 depending on the height difference of the corresponding thin film layer may be disposed on the first display panel 100. However, the two color filters 230A and 230B that overlap the first spacer S1 and the second spacer S2 may have different heights. In this case, the first spacer S1 and the second spacer S2 disposed on the first color filter 230A may have height differences corresponding to the height difference between the first spacer S1 and the second spacer S2 disposed on the second color filter 230B and the first color filter 230A.

Although not shown in the drawings, a third spacer having a larger distance to the corresponding first display panel 100 than that of the first spacer S1 and the second spacer S2 may be further provided, and the third spacer may be disposed in a position overlapping with each of at least two color filters of the plurality of color filters 230A, 230B, and 230C. The third spacer may have higher disposition density per pixel area than the first spacer S1 or the second spacer S2.

However, the third spacer may have almost the same height as the second spacer S2, but may have a different width or cross-sectional area from the second spacer S2.

The first spacer, the second spacer, and the third spacer may have different disposition density. Specifically, the area of a surface (hereinafter, referred to as the area of the uppermost part) that is the closest to a substrate corresponding to a substrate on which the first spacer S1 is formed may be approximately 3.40 to 6.17% with respect to the area of the uppermost part occupied by the entire spacers. The area of the uppermost part of the second spacer S2 may be approximately 4.44 to 9.02% with respect to the area of the uppermost part occupied by the entire spacers. The area of the uppermost part of the third spacer may be approximately 89.70 to 96.63% with respect to the area of the uppermost part occupied by the entire spacers.

Further, as the size of the liquid crystal display increases, the disposition density of the first spacer may relatively decreased, and the disposition density of the third spacer may relatively increase.

A difference between the distance from the first display panel 100 to the first spacer S1, whose distance from the corresponding first display panel 100 is the least almost 0 and the distance from the first display panel 100 to the third spacer whose distance from the corresponding first display panel 100 is the largest, may be maximum at most 0.6 µm to 1.5 µm. Further, the difference between the distance from the first display panel 100 to the first spacer S1 and the distance from the first display panel 100 to the second spacer S2 and the difference between the distance from the first display panel 100 to the second spacer S2 and the distance from the first display panel 100 to the third spacer may be selected according to the liquid crystal display. For example, the difference between the distance from the first display panel 100 to the first spacer S1 and the distance from the first display panel 100 to the second spacer S2 may be approximately 0.3 µm to 0.7 µm and the difference between the distance from the first display panel 100 to the second spacer S2 and the distance from the first display panel 100 to the third spacer may be approximately 0.3 µm to 0.7 µm.

Although the widths of the first spacer S1 and the second spacer S2 may be different from each other, the widths of the first spacer S1 and the second spacer S2 may also be equal to each other.

According to another exemplary embodiment of the present invention, the first spacer S1 may be disposed in a position corresponding to two color filters of a plurality of color filters filtering light at different wavelengths corresponding to a display of different colors, and the second spacer S2 may be disposed in a position corresponding to one of a plurality of color filters.

In the liquid crystal display according to the exemplary embodiments of the present invention, the spacers S1 and S2 may be disposed on the second display panel 200. However, in some cases, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, according to exemplary embodiments of the present invention, the first spacer and the second spacer may be disposed in the plurality of pixel areas. Therefore, as compared with the conventional liquid crystal display in which the first and second spacers may be disposed only in one pixel area, the disposition density of the spacer per pixel area may be lowered, which may prevent the pressure tolerance of the spacer from largely acting only on a specific pixel. As a result, the pressure tolerance of the spacers may be uniformly maintained for every pixel and may prevent the amount of dropping liquid crystal from being insufficient, and thus prevent the light leakage caused by the insufficient liquid crystal.

Figure 4:
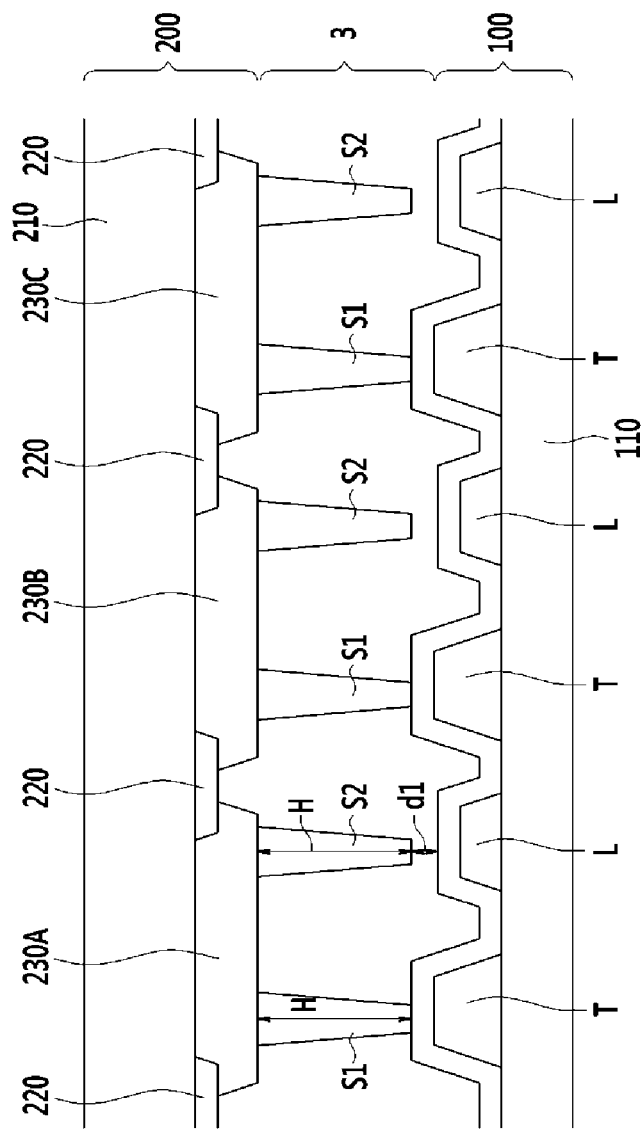
FIG. 4 is a schematic cross-sectional view of a liquid crystal display according to exemplary embodiments of the present invention.

Referring to FIG. 4, the liquid crystal display according to exemplary embodiments of the present invention will be described. FIG. 4 is a schematic cross-sectional view of a liquid crystal display according to exemplary embodiments of the present invention.

The liquid crystal display according to the exemplary embodiments of the present invention may have the similar structure to the liquid crystal display of the above-described exemplary embodiments. The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers disposed on the first substrate 110. The plurality of thin film layers may include T parts on which thin film transistors are disposed, and L parts on which signal lines are disposed. The height of T parts on which thin film transistors are disposed may be larger than the height of L parts on which signal lines are disposed.

The second display panel 200 may include a second substrate 210, a light blocking member 220 disposed on the second substrate 210, and a plurality of color filters 230A, 230B, and 230C disposed on the light blocking member 220 and displaying different colors. The color filters may filter light at different wavelengths corresponding to primary colors. Examples of the primary colors may include colors such as red, green, and blue, or yellow, cyan, or magenta. Although not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different distances from the plurality of thin film layers 120 of the first display panel 100 which face the spacers.

The first spacer S1 and the second spacer S2 may be disposed in a position corresponding to all color filters 230A, 230B, and 230C.

The first spacer S1 may contact both the first display panel 100 and the second display panel 200 so that the cell gap of the liquid crystal display may be maintained by the first spacer S1. The second spacer S2 may be spaced apart from the corresponding first display panel 100 by a predetermined distance d1 and may serve to maintain the cell gap of the liquid crystal display when a force with a larger pressure than the pressure tolerance of the first spacer S1 may be applied to the liquid crystal display. The second spacer S2 may have a higher disposition density per pixel area than the first spacer S1.

The first spacer S1 and the second spacer S2 may have almost the same height H. However, the first spacer S1 may be disposed at a position corresponding to a higher part of the plurality of thin film layers of the first display panel 100, for example, the T parts in which thin film transistors may be disposed, and the second spacer S2 disposed at a position corresponding to a lower part of the plurality of thin film layers of the first display panel 100, and the L parts in which signal lines are disposed. Therefore, the two spacers S1 and S2, which may have the same height, may have different distances from the corresponding first display panel 100 depending on the height difference of the corresponding thin film layer disposed on the first display panel 100.

The exemplary embodiments describe that the height of each part may vary depending on the types of thin film included in the plurality of thin film layers. However, the height of the plurality of thin film layers may be controlled by various ways such as the arrangement of an organic layer or formation of grooves according to the position. Therefore, the plurality of thin film layers of the first display panel 100 of the liquid crystal display may have different heights depending on the arrangement of an organic layer or formation of grooves according to the position.

Although not shown in the drawings, a third spacer may have a larger distance to the corresponding first display panel 100 than that of the first spacer S1 and the second spacer S2 and the third spacer may be disposed in a position overlapping with each of at least two color filters of a plurality of color filters 230A, 230B, and 230C. The third spacer may have higher disposition density per pixel area than the first spacer S1 or the second spacer S2.

The third spacer may have almost the same height as the second spacer S2, but may have a different width or cross-sectional area from the second spacer S2.

The first spacer, the second spacer, and the third spacer may have different disposition density. The area of a surface (hereinafter, referred to as the area of the uppermost part) that is the closest to a substrate corresponding to a substrate on which the first spacer S1 is formed may be approximately 3.40 to 6.17% with respect to the area of the uppermost part occupied by the entire spacers. The area of the uppermost part of the second spacer S2 may be approximately 4.44 to 9.02% with respect to the area of the uppermost part occupied by the entire spacers. The area of the uppermost part of the third spacer may be approximately 89.70 to 96.63% with respect to the area of the uppermost part occupied by the entire spacers.

Further, as the size of the liquid crystal display increase, the disposition density of the first spacer may relatively decrease, and the disposition density of the third spacer may relatively increase.

A difference between the distance from the first display panel 100 to the first spacer S1, whose distance from the corresponding first display panel 100 may be the least, almost 0 and the distance from the first display panel 100 to the third spacer, whose distance from the corresponding first display panel 100 may be at most 0.6 µm to 1.5 µm. Further, the difference between the distance from the first display panel 100 to the first spacer S1 and the distance from the first display panel 100 to the second spacer S2 and the difference between the distance from the first display panel 100 to the second spacer S2 and the distance from the first display panel 100 to the third spacer may appropriately be selected according to the liquid crystal display. For example, the difference between the distance from the first display panel 100 to the first spacer S1 and the distance from the first display panel 100 to the second spacer S2 may be approximately 0.3 µm to 0.7 µm and the difference between the distance from the first display panel 100 to the second spacer S2 and the distance from the first display panel 100 to the third spacer may be approximately 0.3 µm to 0.7 µm.

In some cases, the widths of the first spacer S1 and the second spacer S2 may be different from each other. In some cases the widths of the first spacer S1 and the second spacer S2 may be equal to each other.

In the liquid crystal display according to the exemplary embodiments of the present invention, the spacers S1 and S2 may be disposed on the second display panel 200. However, in the liquid crystal display according to exemplary embodiments of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, the first spacer and the second spacer may be disposed in the plurality of pixel areas. Therefore, as compared with the conventional liquid crystal display in which the first and second spacers are disposed only in one pixel area, the disposition density of the spacer per pixel area is lowered, which may prevents the pressure tolerance of the spacer from largely acting only on a specific pixel. As a result, the pressure tolerance of the spacers may be uniformly maintained for every pixel and may prevent the amount of dropping liquid crystal from being sufficient, and thus preventing the light leakage caused by the insufficient liquid crystal.

Figure 5:
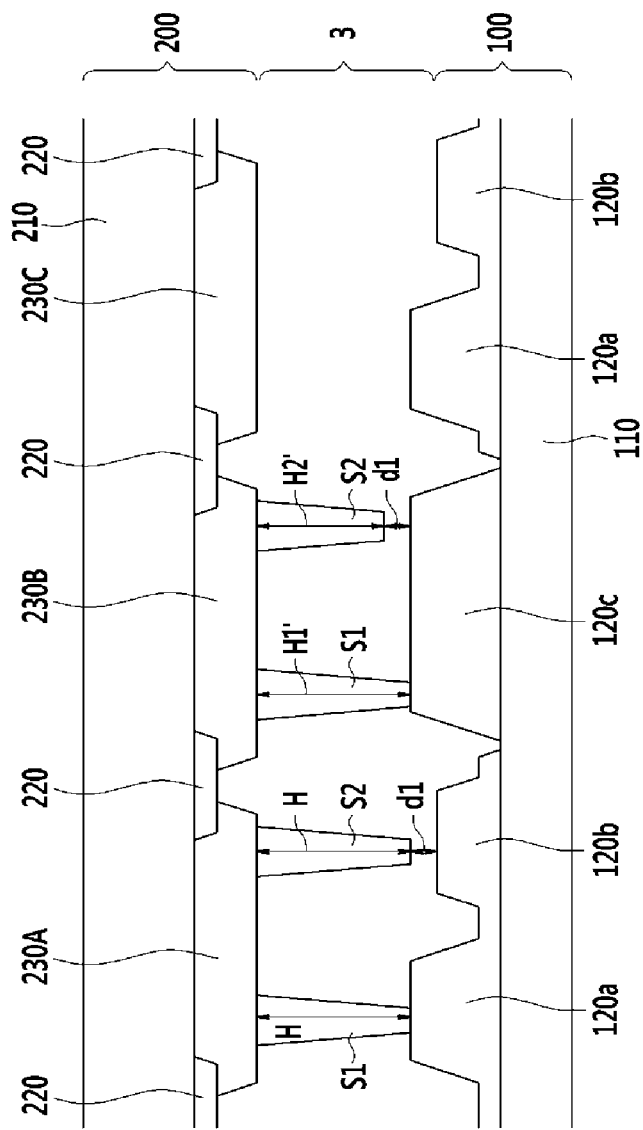
FIG. 5 is a schematic cross-sectional view of a liquid crystal display according to exemplary embodiments of the present invention.

Referring to FIG. 5, the liquid crystal display according to another exemplary embodiment of the present invention will be described. FIG. 5 is a schematic cross-sectional view of a liquid crystal display according to exemplary embodiments of the present invention.

The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110 and a plurality of thin film layers disposed on the first substrate 110. The plurality of thin film layers may include parts 120a, 120b, and 120c with different heights.

The second display panel 200 may include a second substrate 210, a light blocking member 220 disposed on the second substrate 210, and a plurality of color filters 230A, 230B, and 230C disposed on the light blocking member 220 and displaying different colors. The color filters may filter light at different wavelengths corresponding to a display of primary colors. Examples of the primary colors may include primary colors such as red, green, and blue, or yellow, cyan, or magenta. Although not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different distances from the plurality of thin film layers 120 of the first display panel 100 which face the spacers.

The plurality of first spacers S1 may be disposed in a position corresponding to each of at least two color filters 230A and 230B of the plurality of color filters 230A, 230B, and 230C. The plurality of second spacers S2 may be disposed in a position which may correspond to each of at least two color filters 230A and 230B of the plurality of color filters 230A, 230B, and 230C.

The first spacer S1 may contact both the first display panel 100 and the second display panel 200 so that the cell gap of the liquid crystal display may be maintained by the first spacer S1. The second spacer S2 may be spaced apart from the corresponding first display panel 100 by a predetermined distance d1 and may serve to maintain the cell gap of the liquid crystal display when a force with a larger pressure than the pressure tolerance of the first spacer S1 may be applied to the liquid crystal display. The second spacer S2 may have a higher disposition density per pixel area than the first spacer S1.

The first spacer S1 and the second spacer S2 may be disposed in a position corresponding to the second color filter 230B among the plurality of color filters 230A, 230B, and 230C. Further, the heights of a plurality of thin film layer 120c of the first display panel 100 corresponding to the first spacer S1 and the second spacer S2 may almost the same as compared to each other. Therefore, the distances from the first spacer and the second spacer to the corresponding first display panel 100 varied depending on the difference in height of the first spacer S1 and the second spacer S2.

The first spacer S1 and the second spacer S2, which are disposed in a position corresponding to the second color filter 230B among the plurality of color filters 230A, 230B, and 230C, may have different heights. Further, the heights of the plurality of thin film layers of the first display panel 100 may correspond to the first spacer S1 and the second spacer S2 may be the same as compared to each other. Therefore, the distance to the first display panel 100 may be varied depending upon the difference in height.

The height difference of the plurality of thin film layers may be disposed on the first display panel 100 which may be caused by the difference of the layers included in the thin film layers or controlled by the arrangement of an organic layer according to the position or formation of grooves according to the position.

However, the two color filters 230A and 230B may overlap the first spacer S1 and the second spacer S2 may have different heights. In this case, the first spacer S1 and the second spacer S2 may be disposed on the first color filter 230A may have height differences corresponding to the height difference between the first spacer S1 and the second spacer S2 disposed on the second color filter 230B and the first color filter 230A Although not shown in the drawings, a third spacer may have a larger distance to the corresponding first display panel 100 than that of the first spacer S1 and the second spacer S2 may be further provided, and the third spacer may be disposed in a position overlapping with each of at least two color filters of the plurality of color filters 230A, 230B, and 230C. The third spacer may have higher disposition density per pixel area than the first spacer S1 or the second spacer S2.

However, the third spacer may have almost the same height as the second spacer S2, but may have a different width or cross-sectional area from the second spacer S2.

The first spacer, the second spacer, and the third spacer may have different disposition density. The area of a surface of the uppermost part of the first spacer S1 may be approximately 3.40 to 6.17% with respect to the area of the uppermost part occupied by the entire spacers. The uppermost part may refer to a surface which may be closest to a substrate corresponding to a substrate on which the first spacer S1 is located. The area of the uppermost part of the second spacer S2 may be approximately 4.44 to 9.02% with respect to the area of the uppermost part occupied by the entire spacers. The area of the uppermost part of the third spacer may be approximately 89.70 to 96.63% with respect to the area of the uppermost part occupied by the entire spacers.

Further, as the size of the liquid crystal display may increase, the disposition density of the first spacer may be relatively decreased, and the disposition density of the third spacer may be relatively increased.

A difference between the distance from the first display panel 100 to the first spacer S1, whose distance from the corresponding first display panel 100 may be the least, almost 0, and the distance from the first display panel 100 to the third spacer, whose distance from the corresponding first display panel 100 may be at most 0.6 µm to 1.5 µm. Further, the difference between the distance from the first display panel 100 to the first spacer S1 and the distance from the first display panel 100 to the second spacer S2 and the difference between the distance from the first display panel 100 to the second spacer S2 and the distance from the first display panel 100 to the third spacer may appropriately be selected according to the liquid crystal display. For example, the difference between the distance from the first display panel 100 to the first spacer S1 and the distance from the first display panel 100 to the second spacer S2 may be approximately 0.3 µm to 0.7 µm and the difference between the distance from the first display panel 100 to the second spacer S2 and the distance from the first display panel 100 to the third spacer may be approximately 0.3 µm to 0.7 µm.

In the exemplary embodiments, even though the widths of the first spacer S1 and the second spacer S2 are equal to each other, the widths of the first spacer S1 and the second spacer S2 may be different from each other.

According to another exemplary embodiment of the present invention, the first spacer S1 may be disposed in a position corresponding to two color filters of a plurality of color filters displaying different colors, and the second spacer S2 may be disposed in a position corresponding to one of a plurality of color filters displaying different colors.

In the liquid crystal display according to the exemplary embodiments of the present invention, the spacers S1 and S2 may be disposed on the second display panel 200. However, in the liquid crystal display according to another exemplary embodiment of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, the liquid crystal display according to the exemplary embodiments of the present invention, the first spacer and the second spacer may be disposed in the plurality of pixel areas. Therefore, as compared with the conventional liquid crystal display in which the first and second spacers may be disposed only in one pixel area, the disposition density of the spacer per pixel area may be lowered, which may prevent the pressure tolerance of the spacer from largely acting only on a specific pixel. As a result, the pressure tolerance of the spacers may uniformly be maintained for every pixel and may prevent the amount of dropping liquid crystal from being insufficient, and may prevent the light leakage caused by the insufficient liquid crystal.

Figure 6:
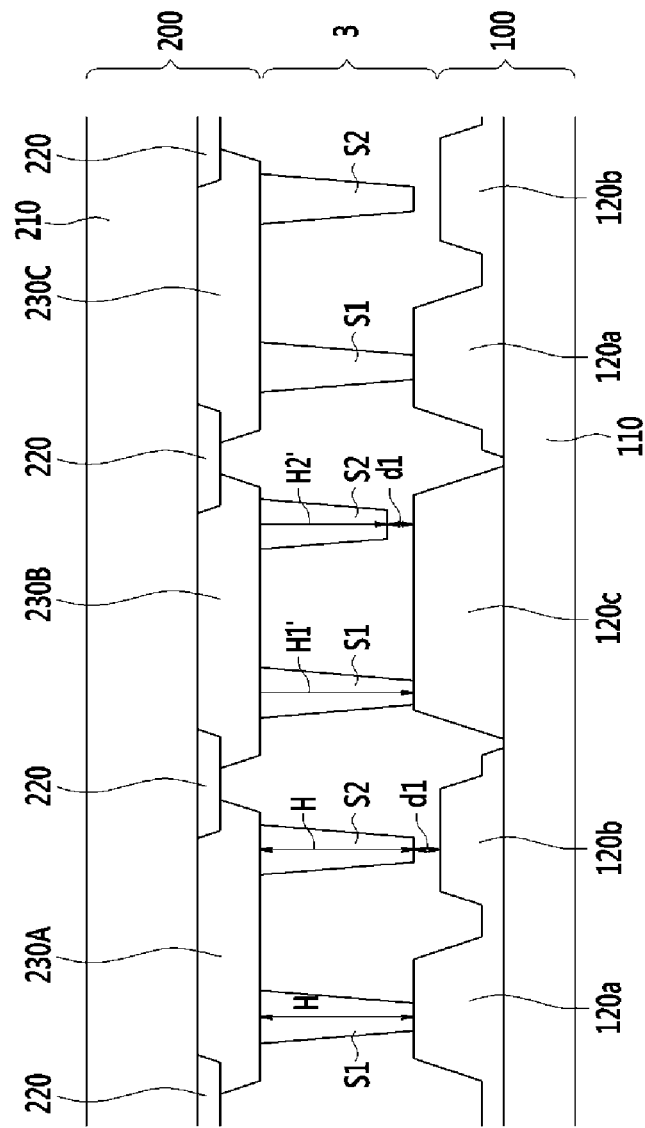
FIG. 6 is a schematic cross-sectional view of a liquid crystal display according to exemplary embodiments of the present invention.

Referring to FIG. 6, the liquid crystal display according to another exemplary embodiment of the present invention will be described. FIG. 6 is a schematic cross-sectional view of a liquid crystal display according to exemplary embodiments of the present invention.

The liquid crystal display according to the exemplary embodiments of the present invention may have the similar structure to the liquid crystal display according to the above-described exemplary embodiment of FIG. 5. The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers may be disposed on the first substrate 110. The plurality of thin film layers may include parts 120a, 120b, and 120c which may have different heights.

The second display panel 200 may include a second substrate 210, a light blocking member 220 may be disposed on the second substrate 210, and a plurality of color filters 230A, 230B, and 230C disposed on the light blocking member 220 and filter light at different wavelengths corresponding to a display of different colors. The color filters may display one of the primary colors. Examples of the primary colors include primary colors such as red, green, and blue, or yellow, cyan, or magenta. Although not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different distances from the plurality of thin film layers 120 of the first display panel 100 which face the spacers.

The first spacer S1 and the second spacer S2 may be disposed in positions corresponding to all the color filters 230A, 230B, and 230C filtering light at different wavelengths corresponding to different colors.

The first spacer S1 may contact both the first display panel 100 and the second display panel 200 and the cell gap of the liquid crystal display may be maintained by the first spacer S1. The second spacer S2 may be spaced apart from the corresponding first display panel 100 by a predetermined distance d1 and may serve to maintain the cell gap of the liquid crystal display when a force with a larger pressure than the pressure tolerance of the first spacer S1 may be applied to the liquid crystal display. The second spacer S2 may have a higher disposition density per pixel area than the first spacer S1.

The first spacer S1 and the second spacer S2 may be disposed in a position corresponding to the first color filter 230A among the plurality of color filters 230A, 230B, and 230C which may have almost the same height. However, the first spacer S1 may be disposed in a position corresponding to the higher part 120a of the plurality of thin film layers of the first display panel 100, and the second spacer S2 may be disposed in a position corresponding to the lower part 120b of the plurality of thin film layers of the first display panel 100. Therefore, the two spacers S1 and S2, which have the same height, may have different distances from the corresponding first display panel 100 depending on the height difference of the corresponding thin film layer may be disposed on the first display panel 100.

The first spacer S1 and the second spacer S2 may be disposed in a position corresponding to the second color filter 230B among the plurality of color filters 230A, 230B, and 230C which may have different heights. Further, the heights of a plurality of thin film layer 120c of the first display panel 100 corresponding to the first spacer S1 and the second spacer S2 may be almost the same as compared to each other. Therefore, the distances from the first spacer S1 and the second spacer S2 to the corresponding first display panel 100 may vary depending on the height difference of the first spacer S1 and the second spacer S2.

The first spacer S1 and the second spacer S2, which may be disposed in a position corresponding to the third color filter 230C among the plurality of color filters 230A, 230B, and 230C may have almost the same height. However, the first spacer S1 may be disposed in a position corresponding to the higher part 120a of the plurality of thin film layers of the first display panel 100, and the second spacer S2 may be disposed in a position corresponding to the lower part 120b of the plurality of thin film layers of the first display panel 100. Therefore, the two spacers S1 and S2, which have the same height, may have different distances from the corresponding first display panel 100 depending on the height difference of the corresponding thin film layer may be disposed on the first display panel 100.

The height difference of the plurality of thin film layers may be disposed on the first display panel 100 may be caused by the difference of the layers included in the thin film layers or controlled by the arrangement of an organic layer according to the position or formation of grooves according to the position.

However, the two color filters 230A and 230B which may overlap the first spacer S1 and the second spacer S2 may have different heights. In this case, the first spacer S1 and the second spacer S2 may be disposed on the first color filter 230A may have height differences corresponding to the height difference between the first spacer S1 and the second spacer S2 may be disposed on the second color filter 230B and the first color filter 230A.

Although not shown in the drawings, a third spacer having a larger distance to the corresponding first display panel 100 than that of the first spacer S1 and the second spacer S2 may be further provided, and the third spacer may be disposed in a position overlapping with each of at least two color filters of the plurality of color filters 230A, 230B, and 230C. The third spacer may have higher disposition density per pixel area than the first spacer S1 or the second spacer S2.

However, the third spacer may have almost the same height as the second spacer S2, but may have a different width or cross-sectional area from the second spacer S2.

The first spacer, the second spacer, and the third spacer may have different disposition density. The area of a surface of the uppermost part of the first spacer S1 may be approximately 3.40 to 6.17% with respect to the area of the uppermost part occupied by the entire spacers. The uppermost part may refer to a surface which may be closest to a substrate corresponding to a substrate on which the first spacer S1 is located. The area of the uppermost part of the second spacer S2 may be approximately 4.44 to 9.02% with respect to the area of the uppermost part occupied by the entire spacers. The area of the uppermost part of the third spacer may be approximately 89.70 to 96.63% with respect to the area of the uppermost part occupied by the entire spacers.

Further, as the size of the liquid crystal display is increased, the disposition density of the first spacer may be relatively decreased, and the disposition density of the third spacer may be relatively increased.

A difference between the distance from the first display panel 100 to the first spacer S1, whose distance from the corresponding first display panel 100 may be the least, almost 0, and the distance from the first display panel 100 to the third spacer, whose distance from the corresponding first display panel 100 may be at most 0.6 µm to 1.5 µm. Further, the difference between the distance from the first display panel 100 to the first spacer S1 and the distance from the first display panel 100 to the second spacer S2 and the difference between the distance from the first display panel 100 to the second spacer S2 and the distance from the first display panel 100 to the third spacer may appropriately be selected according to the liquid crystal display. For example, the difference between the distance from the first display panel 100 to the first spacer S1 and the distance from the first display panel 100 to the second spacer S2 may be approximately 0.3 µm to 0.7 µm and the difference between the distance from the first display panel 100 to the second spacer S2 and the distance from the first display panel 100 to the third spacer may be approximately 0.3 µm to 0.7 µm.

In the exemplary embodiments, even though the widths of the first spacer S1 and the second spacer S2 may be equal to each other, the widths of the first spacer S1 and the second spacer S2 may be different from each other.

In the liquid crystal display according to the exemplary embodiments of the present invention, the spacers S1 and S2 may be disposed on the second display panel 200. However, in the liquid crystal display according to another exemplary embodiment of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, the liquid crystal display according to the exemplary embodiments of the present invention, the first spacer and the second spacer may be disposed in the plurality of pixel areas. Therefore, as compared with the conventional liquid crystal display in which the first and second spacers may be disposed only in one pixel area, the disposition density of the spacer per pixel area is lowered, which may prevent the pressure tolerance of the spacer from largely acting only on a specific pixel. As a result, the pressure tolerance of the spacers may uniformly be maintained for every pixel and may prevent the amount of dropping liquid crystal from being insufficient, and may prevent the light leakage caused by the insufficient liquid crystal.

Figure 7:
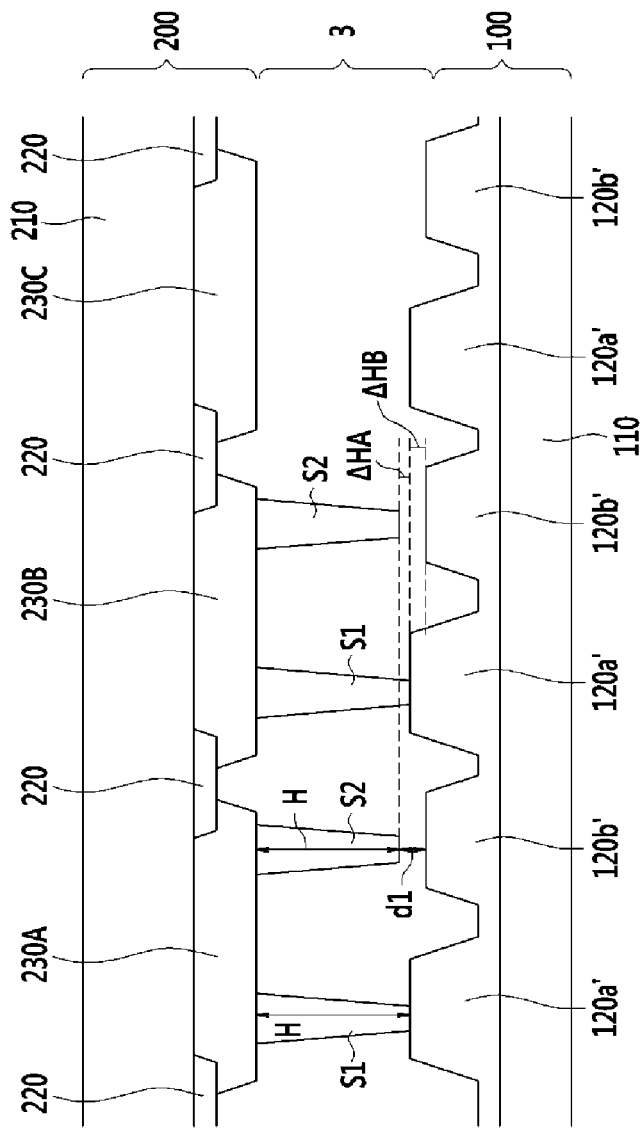
FIG. 7 is a schematic cross-sectional view of a liquid crystal display according to exemplary embodiments of the present invention.

Referring to FIG. 7, the liquid crystal display according to another exemplary embodiment of the present invention will be described. FIG. 7 is a schematic cross-sectional view of a liquid crystal display according to exemplary embodiments of the present invention.

The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers may be disposed on the first substrate 110. The plurality of thin film layers may include parts 120a' and 120b' with different heights.

The second display panel 200 may include a second substrate 210, a light blocking member 220 may be disposed on the second substrate 210, and a plurality of color filters 230A, 230B, and 230C disposed on the light blocking member 220 and filter light at different wavelengths corresponding to a display of different colors. Examples of the primary colors may include primary colors such as red, green, and blue, or yellow, cyan, or magenta. Although not shown in the drawings, the color filter may further include color filters that filter light at different wavelengths corresponding to display a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different distances from the plurality of thin film layers 120 of the first display panel 100 which face the spacers.

The plurality of first spacers S1 may be disposed in a position corresponding to each of at least two color filters 230A and 230B of the plurality of color filters 230A, 230B, and 230C filtering light at different wavelengths corresponding to different colors. The plurality of second spacers S2 may be disposed in a position corresponding to each of at least two color filters 230A and 230B of the plurality of color filters 230A, 230B, and 230C filtering light at different wavelengths corresponding to different colors.

The first spacer S1 may contact both the first display panel 100 and the second display panel 200 so that the cell gap of the liquid crystal display may be maintained by the first spacer S1. The second spacer S2 may be spaced apart from the corresponding first display panel 100 by a predetermined distance d1 and may serve to maintain the cell gap of the liquid crystal display when a force with a larger pressure than the pressure tolerance of the first spacer S1 may be applied to the liquid crystal display. The second spacer S2 may have a higher disposition density per pixel area than the first spacer S1.

The first spacer S1 and the second spacer S2 may have different heights. Further, a plurality of thin film layers 120a' and 120b of the first display panel 100 may correspond to the first spacer S1 and the second spacer S2 which may have different heights. Accordingly, the distance from the first spacer S1 and the second spacer S2 to the corresponding first display panel 100 is varied depending upon the sum of the height difference ΔHA between the first spacer S1 and the second spacer S2 and the height difference ΔHB of the plurality of thin film layers 120a' and 120b' of the first display panel 100 corresponding to the first spacer S1 and the second spacer S2.

The height difference of the plurality of thin film layers may be disposed on the first display panel 100 may be caused by the difference of the layers included in the thin film layers or controlled by the arrangement of an organic layer according to the position or formation of grooves according to the position.

However, the two color filters 230A and 230B which overlap the first spacer S1 and the second spacer S2 may have different heights. For example, the first spacer S1 and the second spacer S2 may be disposed on the first color filter 230A may have height differences corresponding to the height difference between the first spacer S1 and the second spacer S2 may be disposed on the second color filter 230B and the first color filter 230A.

Although not shown in the drawings, a third spacer may have a larger distance to the corresponding first display panel 100 than that of the first spacer S1 and the second spacer S2 may be further provided, and the third spacer may be disposed in a position overlapping with each of at least two color filters of the plurality of color filters 230A, 230B, and 230C. The third spacer may have higher disposition density per pixel area than the first spacer S1 or the second spacer S2.

However, the third spacer may have almost the same height as the second spacer S2, but may have a different width or cross-sectional area from the second spacer S2.

The first spacer, the second spacer, and the third spacer may have different disposition density. The area of a surface of the uppermost part of the first spacer S1 may be approximately 3.40 to 6.17% with respect to the area of the uppermost part may be occupied by the entire spacers. The uppermost part may refer to a surface which may be closest to a substrate corresponding to a substrate on which the first spacer S1 is located. The area of the uppermost part of the second spacer S2 may be approximately 4.44 to 9.02% with respect to the area of the uppermost part occupied by the entire spacers. The area of the uppermost part of the third spacer may be approximately 89.70 to 96.63% with respect to the area of the uppermost part occupied by the entire spacers.

Further, as the size of the liquid crystal display is increased, the disposition density of the first spacer may be relatively decreased, and the disposition density of the third spacer may be relatively increased.

A difference between the distance from the first display panel 100 to the first spacer S1, whose distance from the corresponding first display panel 100 may be the least, almost 0, and the distance from the first display panel 100 to the third spacer, whose distance from the corresponding first display panel 100 may be at most 0.6 μm to 1.5 μm. Further, the difference between the distance from the first display panel 100 to the first spacer S1 and the distance from the first display panel 100 to the second spacer S2 and the difference between the distance from the first display panel 100 to the second spacer S2 and the distance from the first display panel 100 to the third spacer may appropriately be selected according to the liquid crystal display. For example, the difference between the distance from the first display panel 100 to the first spacer S1 and the distance from the first display panel 100 to the second spacer S2 may be approximately 0.3 μm to 0.7 μm and the difference between the distance from the first display panel 100 to the second spacer S2 and the distance from the first display panel 100 to the third spacer may be approximately 0.3 μm to 0.7 μm.

In the exemplary embodiments, even though the widths of the first spacer S1 and the second spacer S2 are equal to each other, the widths of the first spacer S1 and the second spacer S2 may be different from each other.

According to another exemplary embodiment of the present invention, the first spacer S1 may be disposed in a position corresponding to two color filters of a plurality of color filters displaying different colors, and the second spacer S2 may be disposed in a position corresponding to one of a plurality of color filters displaying different colors.

In the liquid crystal display according to the exemplary embodiments of the present invention, the spacers S1 and S2 may be disposed on the second display panel 200. However, in the liquid crystal display according to another exemplary embodiment of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, the liquid crystal display according to the exemplary embodiments of the present invention, the first spacer and the second spacer may be disposed in the plurality of pixel areas. Therefore, as compared with the liquid crystal display according to the prior art in which the first and second spacers may be disposed only in one pixel area, the disposition density of the spacer per pixel area may be lowered, which may prevent the pressure tolerance of the spacer from largely acting only on a specific pixel. As a result, the pressure tolerance of the spacers may uniformly be maintained for every pixel and may prevent the amount of dropping liquid crystal from being insufficient, and may prevent the light leakage caused by the insufficient liquid crystal.

According to the disclosed exemplary embodiments the first spacer S1 and the second spacer S2 may be disposed in a position corresponding to each of two color filters 230A and 230B of the plurality of color filters 230A, 230B, and 230C may display different colors. However, according to the other exemplary embodiments, the first spacer S1, the second spacer S2 and the third spacer may be disposed in a position corresponding to each color filter may be included in the plurality of color filters 230A, 230B, and 230C filtering light at different wavelengths corresponding to different colors.

Figure 8:
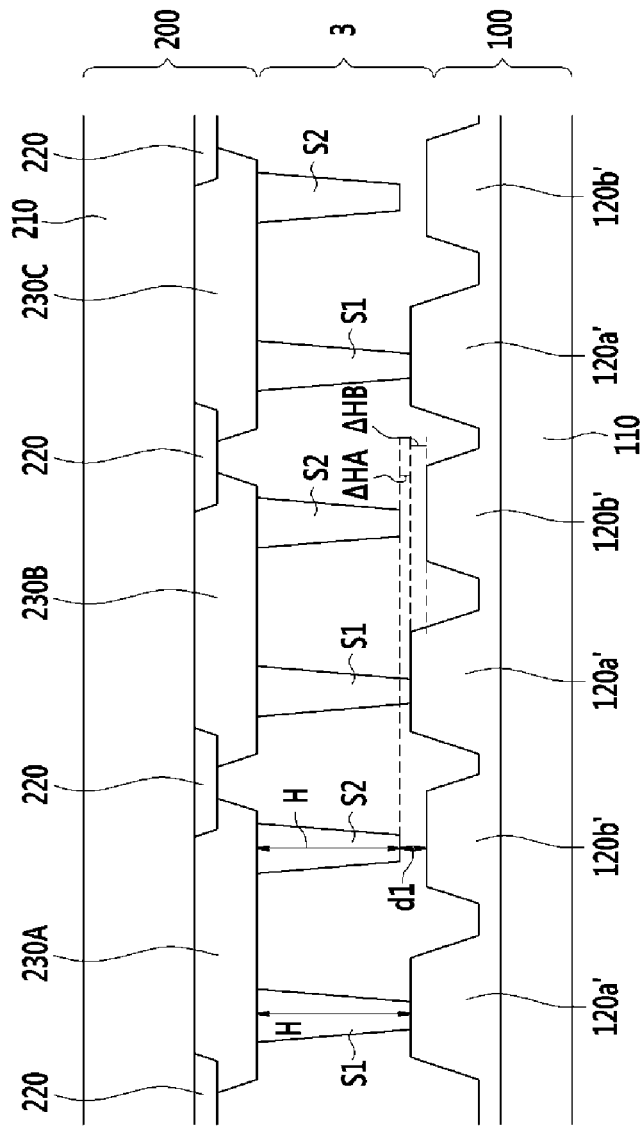
FIG. 8 is a schematic cross-sectional view of a liquid crystal display according to exemplary embodiments of the present invention.

Referring to FIG. 8, the liquid crystal display according to another exemplary embodiment of the present invention will be described. FIG. 8 is a schematic cross-sectional view of a liquid crystal display according to exemplary embodiments of the present invention.

Referring to FIG. 8, the liquid crystal display according to the exemplary embodiments of the present invention may have the similar structure to the liquid crystal display of the above-described exemplary embodiment in FIG. 7. The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers may be disposed on the first substrate 110. The plurality of thin film layers may include parts 120a, 120b, and 120c having different heights.

The second display panel 200 may include a second substrate 210, a light blocking member 220 disposed on the second substrate 210, and a plurality of color filters 230A, 230B, and 230C disposed on the light blocking member 220 and filter light at different wavelengths corresponding to a display of different colors. The color filters may display one of the primary colors. Examples of the primary colors include primary colors such as red, green, and blue, or yellow, cyan, or magenta. Although not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different distances from the plurality of thin film layers of the first display panel 100 which face the spacers.

The first spacer S1 and the second spacer S2 may be disposed in a position corresponding to all color filters 230A, 230B, and 230C filtering light at different wavelengths corresponding to different colors.

The first spacer S1 may contact both the first display panel 100 and the second display panel 200 so that the cell gap of the liquid crystal display may be maintained by the first spacer S1. The second spacer S2 may be spaced apart from the corresponding first display panel 100 by a predetermined distance d1 and may serve to maintain the cell gap of the liquid crystal display when a force with a larger pressure than the pressure tolerance of the first spacer S1 may be applied to the liquid crystal display. The second spacer S2 may have a higher disposition density per pixel area than the first spacer S1.

The first spacer S1 and the second spacer S2 may have different height. Further, a plurality of thin film layers 120a' and 120b of the first display panel 100 may correspond to the first spacer S1 and the second spacer S2 which may have different heights. Accordingly, the distance from the first spacer S1 and the second spacer S2 to the corresponding first display panel 100 is varied depending upon the sum of the height difference ΔHA between the first spacer S1 and the second spacer S2 and the height difference ΔHB of the plurality of thin film layers 120a' and 120b' of the first display panel 100 corresponding to the first spacer S1 and the second spacer S2.

The height difference of the plurality of thin film layers may be disposed on the first display panel 100 may be caused by the difference of the layers may be included in the thin film layers or may be controlled by the arrangement of an organic layer according to the position or formation of grooves according to the position.

However, the color filters 230A and 230B which overlap the first spacer S1 and the second spacer S2 may have different heights. For example, the first spacer S1 and the second spacer S2 may be disposed on the first color filter 230A may have height differences corresponding to the height difference between the first spacer S1 and the second spacer S2 may be disposed on the second color filter 230B and the color filter.

Although not shown in the drawings, a third spacer may have a larger distance to the corresponding first display panel 100 than that of the first spacer S1 and the second spacer S2 may further be provided, and the third spacer may be disposed in a position overlapping with each of at least two color filters of the plurality of color filters 230A, 230B, and 230C. The third spacer may have higher disposition density per pixel area than the first spacer S1 or the second spacer S2.

However, the third spacer may have almost the same height as the second spacer S2, but may with a different width or cross-sectional area from the second spacer S2.

The first spacer, the second spacer, and the third spacer may have different disposition density. The area of a surface of the uppermost part of the first spacer S1 may be approximately 3.40 to 6.17% with respect to the area of the uppermost part occupied by the entire spacers. The uppermost part may refer to a surface which may be closest to a substrate corresponding to a substrate on which the first spacer S1 is located. The area of the uppermost part of the second spacer S2 may be approximately 4.44 to 9.02% with respect to the area of the uppermost part occupied by the entire spacers. The area of the uppermost part of the third spacer may be approximately 89.70 to 96.63% with respect to the area of the uppermost part occupied by the entire spacers.

Further, as the size of the liquid crystal display may increase, the disposition density of the first spacer may relatively be decreased, and the disposition density of the third spacer may relatively be increased.

A difference between the distance from the first display panel 100 to the first spacer S1, whose distance from the corresponding first display panel 100 may be the least, almost 0, and the distance from the first display panel 100 to the third spacer, whose distance from the corresponding first display panel 100 may be at most 0.6 µm to 1.5 µm. Further, the difference between the distance from the first display panel 100 to the first spacer S1 and the distance from the first display panel 100 to the second spacer S2 and the difference between the distance from the first display panel 100 to the second spacer S2 and the distance from the first display panel 100 to the third spacer may appropriately be selected according to the liquid crystal display. For example, the difference between the distance from the first display panel 100 to the first spacer S1 and the distance from the first display panel 100 to the second spacer S2 may be approximately 0.3 µm to 0.7 µm and the difference between the distance from the first display panel 100 to the second spacer S2 and the distance from the first display panel 100 to the third spacer may be approximately 0.3 µm to 0.7 µm.

In the exemplary embodiments, even though the widths of the first spacer S1 and the second spacer S2 may equal to each other, the widths of the first spacer S1 and the second spacer S2 may be different from each other.

In the liquid crystal display according to the exemplary embodiments of the present invention, the spacers S1 and S2 may be disposed on the second display panel 200. However, in the liquid crystal display according to another exemplary embodiment of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, the liquid crystal display according to the exemplary embodiments of the present invention, the first spacer and the second spacer may be disposed in the plurality of pixel areas. Therefore, as compared with the liquid crystal display according to the prior art in which the first and second spacers may be disposed only in one pixel area, the disposition density of the spacer per pixel area may be lowered, which may prevent the pressure tolerance of the spacer from largely acting only on a specific pixel. As a result, the pressure tolerance of the spacers may uniformly be maintained for every pixel and may prevent the amount of dropping liquid crystal from being insufficient, and may prevent the light leakage caused by the insufficient liquid crystal.

Figure 9:
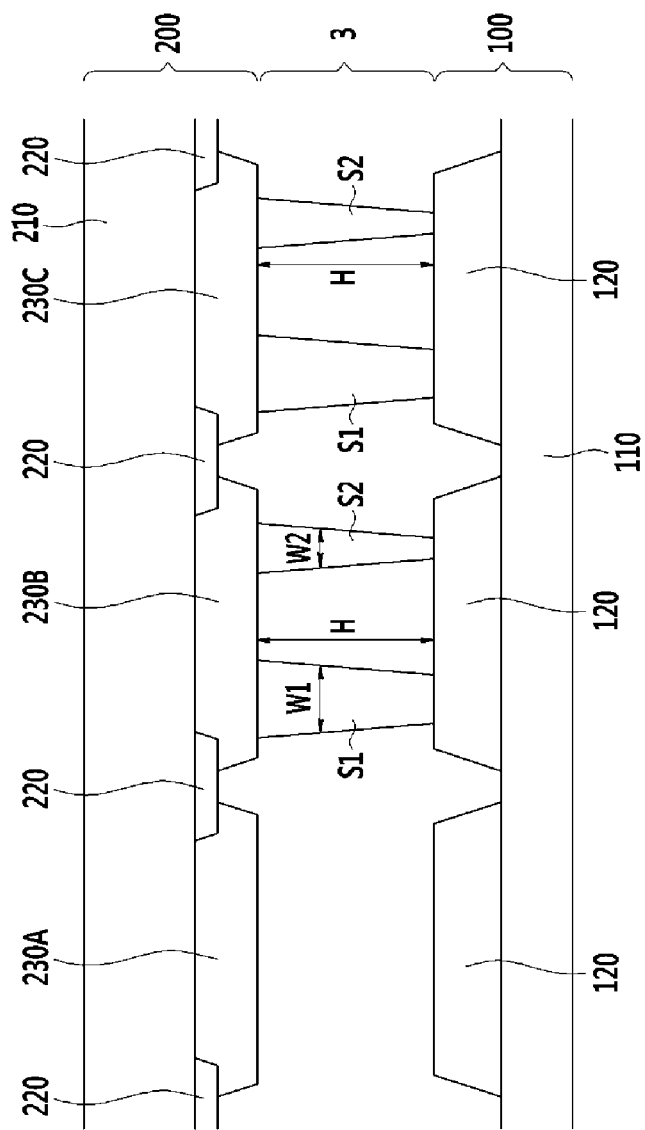
FIG. 9 is a schematic cross-sectional view of a liquid crystal display according to exemplary embodiments of the present invention.

Referring to FIG. 9, the liquid crystal display according to another exemplary embodiment of the present invention will be described. FIG. 9 is a schematic cross-sectional view of a liquid crystal display according to exemplary embodiments of the present invention.

Referring to FIG. 9, the liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers 120 may be disposed on the first substrate 110.

The second display panel 200 may include a second substrate 210, a light blocking member 220 disposed on the second substrate 210, and a plurality of color filters 230A, 230B, and 230C disposed on the light blocking member 220 and filter light at different wavelengths corresponding to a display of different colors. The color filters may display one of the primary colors. Examples of the primary colors include primary colors such as red, green, and blue, or yellow, cyan, or magenta. Although not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different pressure tolerances. The first spacer S1 may have larger pressure tolerance than the second spacer S2. Therefore, the first spacer S1 mainly may maintain the cell gap of the liquid crystal display and the second spacer S2 may serve to supportively maintain the cell gap of the liquid crystal display when a force with a larger pressure than the pressure tolerance of the first spacer S1 may be applied to the liquid crystal display. The second spacer S2 may have smaller pressure tolerance than the first spacer S1, but may have larger disposition density per pixel area.

In the exemplary embodiments, the first spacer S1 and the second spacer S2 may have different widths. The width W1 of the first spacer S1 may be larger than the width W2 of the second spacer S2. Further, the first spacer S1 and the second spacer S2 may have almost the same height H. As described above, the spacers which have the same height but different widths may have different pressure tolerances.

The plurality of first spacers S1 may be disposed in a position which may correspond to each of at least two color filters 230A and 230B of the plurality of color filters 230A, 230B, and 230C filtering light at different wavelengths corresponding to different colors. The plurality of second spacers S2 may be disposed in a position which may correspond to each of at least two color filters 230A and 230B of the plurality of color filters 230A, 230B, and 230C.

Although not shown in the drawings, a third spacer may have smaller pressure tolerance than the first spacer S1 and the second spacer S2 may be further provided. The third spacer may be disposed in a position overlapping each of at least two color filters of the plurality of color filters 230A, 230B, and 230C. The third spacer may have a smaller cross-sectional area than the first spacer S1 and the second spacer S2. The third spacer may have smaller pressure tolerance than the first spacer S1 and the second spacer S2, but may have larger disposition density per pixel area.

However, the third spacer may have almost the same height as the second spacer S2, but may have a different width or cross-sectional area from the second spacer S2.

Although the exemplary embodiments discloses that the first spacer S1 and the second spacer S2 may have the same height and may have a different width or cross-sectional area, in the liquid crystal display according to another exemplary embodiment of the present invention, the second spacer S2 may have the different width, cross-sectional area, and height from the first spacer S1. Further, the second spacer S2 may have the same height as the third spacer and may have a different width or cross-sectional area from the third spacer.

The first spacer, the second spacer, and the third spacer may have different disposition density. The area of a surface of the uppermost part of the first spacer S1 may be approximately 3.40 to 6.17% with respect to the area of the uppermost part may be occupied by the entire spacers. The uppermost part may refer to a surface which may be closest to a substrate corresponding to a substrate on which the first spacer S1 is located. The area of the uppermost part of the second spacer S2 may be approximately 4.44 to 9.02% with respect to the area of the uppermost part occupied by the entire spacers. The area of the uppermost part of the third spacer may be approximately 89.70 to 96.63% with respect to the area of the uppermost part occupied by the entire spacers.

Further, as the size of the liquid crystal display increases, the disposition density of the first spacer may relatively decreased, and the disposition density of the third spacer may relatively increase.

According to the exemplary embodiments, it is disclosed that the first spacer S1 and the second spacer S2 may have different pressure tolerance caused by the different cross-sectional area. But, in the liquid crystal display according to another exemplary embodiment of the present invention, the first spacer S1, the second spacer S2, and the third spacer may have different cross-sectional shapes. For example, as the cross-sectional shape of the spacer may be changed to circular, polygon, oval, or quadrangle, the pressure tolerance of the spacers may be varied. Further, if the pressure tolerance is varied, a cross-sectional shape may correspondingly be changed.

Further, according to another exemplary embodiment of the present invention, the first spacer S1 may be disposed in a position corresponding to two color filters of a plurality of color filters displaying different colors, and the second spacer S2 may be disposed in a position corresponding to one of a plurality of color filters displaying different colors.

In the liquid crystal display according to the exemplary embodiments of the present invention, the spacers S1 and S2 may be disposed on the second display panel 200. However, in the liquid crystal display according to another exemplary embodiment of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, according to the liquid crystal display of the exemplary embodiments of the present invention, the first spacer and the second spacer may be disposed in the plurality of pixel areas. Therefore, as compared with the conventional liquid crystal display in which the first and second spacers may be disposed only in one pixel area, the disposition density of the spacer per pixel area may be lowered, which may prevent the pressure tolerance of the spacer from largely acting only on a specific pixel. As a result, the pressure tolerance of the spacers may uniformly be maintained for every pixel and may prevent the amount of dropping liquid crystal from being insufficient, and may prevent the light leakage may be caused by the insufficient liquid crystal.

Figure 10:
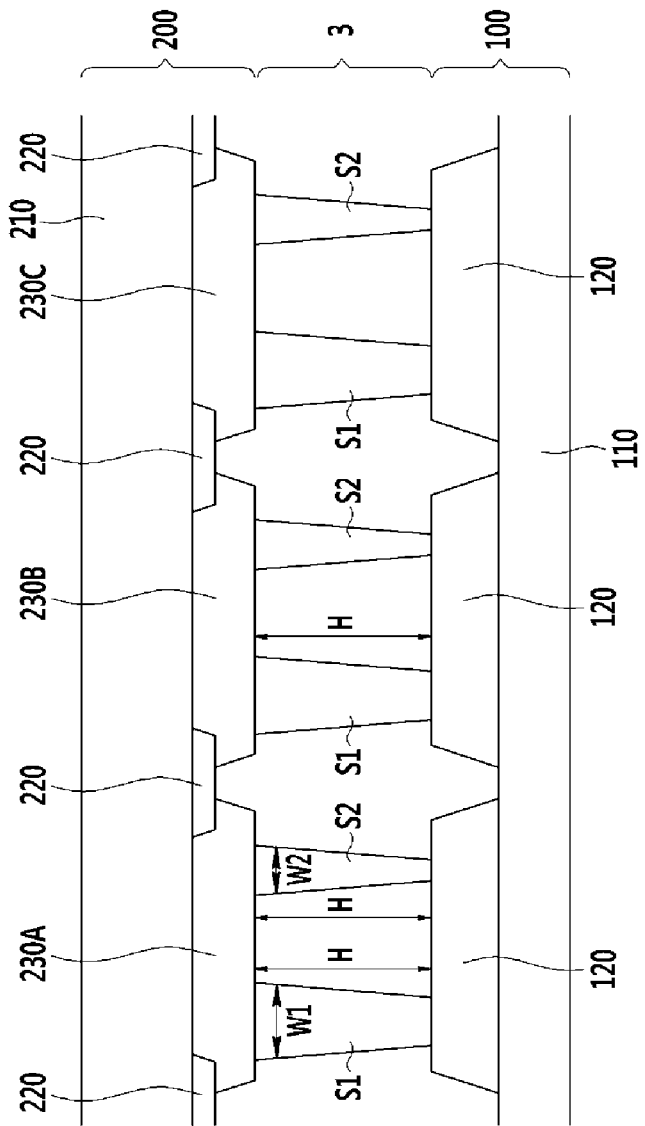
FIG. 10 is a schematic cross-sectional view of a liquid crystal display according to exemplary embodiments of the present invention.

Referring to FIG. 10, the liquid crystal display according to exemplary embodiments of the present invention will be described. FIG. 10 is a schematic cross-sectional view of a liquid crystal display according to exemplary embodiments of the present invention.

The liquid crystal display according to the exemplary embodiments of the present invention may have the similar structure to the liquid crystal display of the above-described exemplary embodiment of FIG. 9. The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film 120 layers may be disposed on the first substrate 110.

The second display panel 200 may include a second substrate 210, a light blocking member 220 disposed on the second substrate 210, and a plurality of color filters 230A, 230B, and 230C disposed on the light blocking member 220 and filter light at different wavelengths corresponding to a display of different colors. The color filters may display one of the primary colors. Examples of the primary colors include primary colors such as red, green, and blue, or yellow, cyan, or magenta. Although not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different pressure tolerances. The first spacer S1 may have larger pressure tolerance than the second spacer S2. Therefore, the first spacer S1 mainly maintains the cell gap of the liquid crystal display and the second spacer S2 may serve to supportively maintain the cell gap of the liquid crystal display when a force with a larger pressure than the pressure tolerance of the first spacer S1 may be applied to the liquid crystal display.

In the exemplary embodiments, the first spacer S1 and the second spacer S2 may have different widths. The width W1 of the first spacer S1 may be larger than the width W2 of the second spacer S2. Further, the first spacer S1 and the second spacer S2 may have almost the same height H. As described above, the spacers which have the same height but different widths may have different pressure tolerances.

The first spacer S1 and the second spacer S2 may be disposed in a position corresponding to each of the plurality of color filters 230A, 230B, and 230C may display different colors.

Although not shown in the drawings, a third spacer may have smaller pressure tolerance than that of the first spacer S1 and the second spacer S2 may further be provided, and the third spacer may be disposed in a position overlapping with each of at least two color filters of the plurality of color filters 230A, 230B, and 230C. The third spacer may have smaller pressure tolerance than the first spacer S1 and the second spacer S2, but may have larger disposition density.

However, the third spacer may have almost the same height as the second spacer S2, but may have a different width or cross-sectional area from the second spacer S2.

The first spacer, the second spacer, and the third spacer may have different disposition density. The area of a surface of the uppermost part of the first spacer S1 may be approximately 3.40 to 6.17% with respect to the area of the uppermost part occupied by the entire spacers. The uppermost part may refer to a surface which may be closest to a substrate corresponding to a substrate on which the first spacer S1 is located. The area of the uppermost part of the second spacer S2 may be approximately 4.44 to 9.02% with respect to the area of the uppermost part occupied by the entire spacers. The area of the uppermost part of the third spacer may be approximately 89.70 to 96.63% with respect to the area of the uppermost part occupied by the entire spacers.

Further, as the size of the liquid crystal display may increase, the disposition density of the first spacer may be relatively decreased, and the disposition density of the third spacer may be relatively increased.

According to the exemplary embodiments, it is disclosed that the first spacer S1 and the second spacer S2 may have different pressure tolerance caused by the different cross-sectional area. But, in the liquid crystal display according to another exemplary embodiment of the present invention, the first spacer S1, the second spacer S2, and the third spacer may have different cross-sectional shapes. For example, as the cross-sectional shape of the spacer may be changed to circle, polygon, oval, or quadrangle, the pressure tolerance of the spacers may be varied. Further, if the pressure tolerance is varied, a cross-sectional shape may correspondingly be changed.

In the liquid crystal display according to the exemplary embodiments of the present invention, the spacers S1 and S2 may be disposed in the second display panel 200. However, in the liquid crystal display according to another exemplary embodiment of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, the liquid crystal display according to the exemplary embodiments of the present invention, the first spacer and the second spacer may be disposed in the plurality of pixel areas. Therefore, as compared with the conventional liquid crystal display in which the first and second spacers may be disposed only in one pixel area, the disposition density of the spacer per pixel area may be lowered, which may prevent the pressure tolerance of the spacer from largely acting only on a specific pixel. As a result, the pressure tolerance of the spacers may uniformly be maintained for every pixel and may prevent the amount of dropping liquid crystal from being insufficient, and may prevent the light leakage may be caused by the insufficient liquid crystal.

Figure 11:
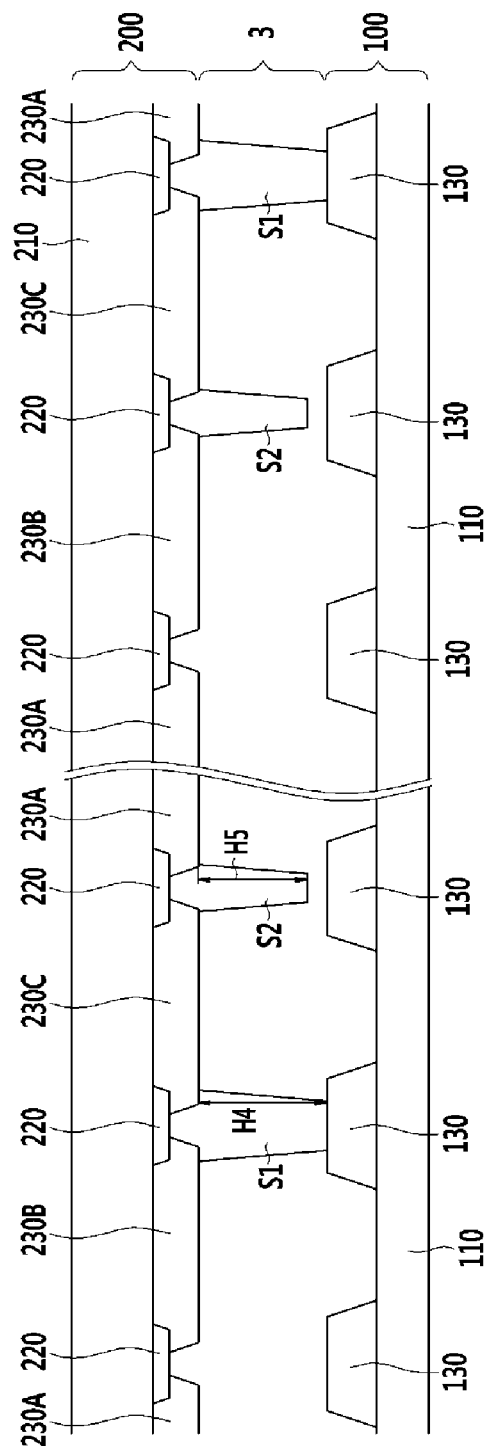
FIG. 11 is a schematic cross-sectional view of a liquid crystal display according to exemplary embodiments of the present invention.

Referring to FIG. 11, the liquid crystal display according to exemplary embodiments of the present invention will be described. FIG. 11 is a schematic cross-sectional view of a liquid crystal display according to exemplary embodiments of the present invention.

The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers 130 may be disposed on the first substrate 110.

The second display panel 200 may include a second substrate 210, a light blocking member 220 disposed on the second substrate 210, and a plurality of color filters 230A, 230B, and 230C disposed on the light blocking member 220 and filter light at different wavelengths corresponding to a display of different colors. The color filters may display one of the primary colors. Examples of the primary colors include primary colors such as red, green, and blue, or yellow, cyan, or magenta. Even though not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different distances from the plurality of thin film layers 130 of the first display panel 100 which face the spacers.

The first spacer S1 may contact both the first display panel 100 and the second display panel 200 so that the cell gap of the liquid crystal display may be maintained by the first spacer S1. The second spacer S2 may be spaced apart from the corresponding first display panel 100 by a predetermined distance and may serve to maintain the cell gap of the liquid crystal display when a force with a larger pressure than the pressure tolerance of the first spacer S1 may be applied to the liquid crystal display. The second spacer S2 may have a higher disposition density per pixel area than the first spacer S1.

The first spacer S1 and the second spacer S2 may be disposed in two of a position corresponding to the first color filter 230A and the second color filter 230B and the light blocking member 220 between the two color filters 230A and 230B of the plurality of color filters 230A, 230B, and 230C filtering light at different wavelengths corresponding to different colors, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A.

The height of the first spacer S1 may be different from the height of the second spacer S2. The height H4 of the first spacer S1 may be larger than the height H5 of the second spacer S2. The first spacer S1 and the second spacer S2 may be disposed so as to correspond to the position where the corresponding plurality of thin film layers 130 of the first display panel 100 may have the same height. Therefore, due to the different height of the first spacer S1 and the second spacer S2, the distance from the first spacer S1 to the corresponding first display panel 100 may be different from the distance from the second spacer S2 to the corresponding first display panel 100.

Although not shown in the drawings, a third spacer having a larger distance to the corresponding first display panel 100 than that of the first spacer S1 and the second spacer S2 may be further provided and the third spacer may be disposed in a position overlapping each of at least two of a position which may correspond to the first color filter 230A and the second color filter 230B of the plurality of color filters 230A, 230B, and 230C and the light blocking member 220 between the two color filters 230A and 230B, a position which may correspond to the second color filter 230B and the third color filter 230C of the plurality of color filters 230A, 230B, and 230C and the light blocking member 220 between the two color filters 230B and 230C, and a position which may correspond to the third color filter 230C and the first color filter 230A of the plurality of color filters 230A, 230B, and 230C and the light blocking member 220 between the two color filters 230C and 230A. The third spacer may have higher disposition density per pixel area than the first spacer S1 or the second spacer S2.

However, the third spacer may have almost the same height as the second spacer S2, but may have a different width or cross-sectional area from the second spacer S2.

The first spacer, the second spacer, and the third spacer may have different disposition density. The area of a surface of the uppermost part of the first spacer S1 may be approximately 3.40 to 6.17% with respect to the area of the uppermost part occupied by the entire spacers. The uppermost part may refer to a surface which may be closest to a substrate corresponding to a substrate on which the first spacer S1 is located The area of the uppermost part of the second spacer S2 may be approximately 4.44 to 9.02% with respect to the area of the uppermost part occupied by the entire spacers. The area of the uppermost part of the third spacer may be approximately 89.70 to 96.63% with respect to the area of the uppermost part occupied by the entire spacers.

Further, as the size of the liquid crystal display increases, the disposition density of the first spacer may be relatively decreased, and the disposition density of the third spacer may be relatively increased.

A difference of height between the first spacer S1, whose distance from the corresponding first display panel 100 may be the least, almost 0, and the third spacer, whose distance from the corresponding first display panel 100 may be at most 0.6 μm to 1.5 μm. Further, the difference of height between the first spacer S1 and the second spacer S2 and the difference of height between the second spacer S2 and the third spacer may appropriately be selected according to the liquid crystal display. For example, the difference of height between the first spacer S1 and the second spacer S2 may be approximately 0.3 μm to 0.7 μm and the difference of height between the second spacer S2 and the third spacer may be approximately 0.3 μm to 0.7 μm.

In the exemplary embodiments, although the widths of the first spacer S1 and the second spacer S2 may be different from each other, the widths of the first spacer S1 and the second spacer S2 may be almost equal to each other.

Further, according to the exemplary embodiments of the present invention, the first spacer S1 may be disposed so as to correspond to two of a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A. The second spacer S2 may be disposed so as to correspond to any one of a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A.

In the liquid crystal display according to the exemplary embodiments of the present invention, the spacers S1 and S2 may be disposed in the second display panel 200. However, in the liquid crystal display according to another exemplary embodiment of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, according to the liquid crystal display of the exemplary embodiments of the present invention, the first spacer and the second spacer may be disposed in the plurality of pixel areas. Therefore, as compared with the conventional liquid crystal display in which the first and second spacers may be disposed only in one pixel area, the disposition density of the spacer per pixel area may be lowered, which may prevent the pressure tolerance of the spacer from largely acting only on a specific pixel. As a result, the pressure tolerance of the spacers may be uniformly maintained for every pixel and may prevent the amount of dropping liquid crystal from being insufficient, and thus prevent the light leakage caused by the insufficient liquid crystal.

Figure 12:
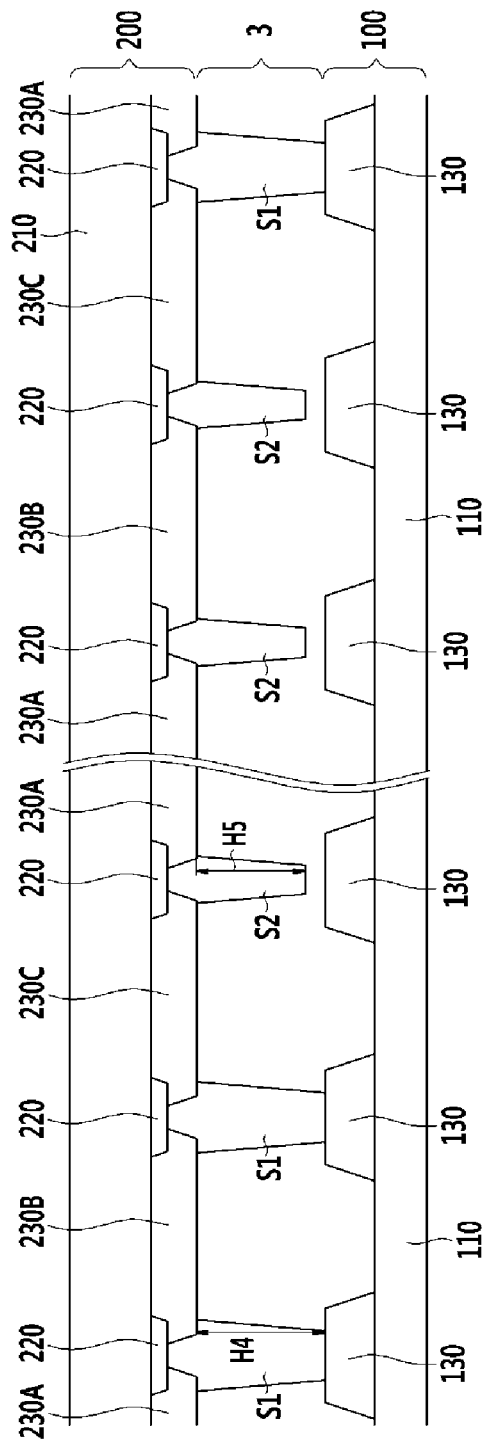
FIG. 12 is a schematic cross-sectional view of a liquid crystal display according to exemplary embodiments of the present invention.

Referring to FIG. 12, the liquid crystal display according to another exemplary embodiment of the present invention will be described. FIG. 12 is a schematic cross-sectional view of a liquid crystal display according to exemplary embodiments of the present invention.

The liquid crystal display according to the exemplary embodiments of the present invention may have the similar structure to the liquid crystal display of the above-described exemplary embodiments. The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers 130 may be disposed on the first substrate 110.

The second display panel 200 may include a second substrate 210, a light blocking member 220 disposed on the second substrate 210, and a plurality of color filters 230A, 230B, and 230C disposed on the light blocking member 220 and displaying different colors. The color filters may filter light at different wavelengths corresponding to primary colors. Examples of the primary colors may include primary colors such as red, green, and blue, or yellow, cyan, or magenta. Although not shown in the drawings, the color filters may further include color filters that filter light at different wavelengths corresponding to a display of a mixture of the primary colors or colors other than the primary colors.

A plurality of spacers S1 and S2 may be disposed between the first display panel 100 and the second display panel 200.

The spacers S1 and S2 may include a first spacer S1 and a second spacer S2 having different distances from the plurality of thin film layers 130 of the first display panel 100 which face the spacers.

The first spacer S1 may contact both the first display panel 100 and the second display panel 200 so that the cell gap of the liquid crystal display may be maintained by the first spacer S1. The second spacer S2 may be spaced apart from the corresponding first display panel 100 by a predetermined distance d1 and may serve to maintain the cell gap of the liquid crystal display when a force with a larger pressure than the pressure tolerance of the first spacer S1 may be applied to the liquid crystal display. The second spacer S2 may have a higher disposition density per pixel area than the first spacer S1

The first spacer S1 and the second spacer S2 may be disposed and may overlap a position corresponding to the first color filter 230A and the second color filter 230Bf the plurality of color filters 230A, 230B, and 230C may display different colors and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A.

The height of the first spacer S1 is different from the height of the second spacer S2. The height H4 of the first spacer S1 is larger than the height H5 of the second spacer S2. The first spacer S1 and the second spacer S2 may be disposed so as to correspond to the position where the corresponding plurality of thin film layers 130 of the first display panel 100 has the same height. Therefore, due to the different height of the first spacer S1 and the second spacer S2, the distance from the first spacer S1 to the corresponding first display panel 100 may be different from the distance from the second spacer S2 corresponding to first display panel 100.

Although not shown in the drawings, a third spacer may have a larger distance from the corresponding first display panel 100 than the first spacer S1 and the second spacer S2 may be further provided. The third spacer may be disposed and may overlap to a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A. The third spacer may have higher disposition density per pixel area than the first spacer S1 or the second spacer S2.

However, the third spacer may have almost the same height as the second spacer S2, but may have a different width or cross-sectional area from the second spacer S2.

The first spacer, the second spacer, and the third spacer may have different disposition density. The area of a surface of the uppermost part of the first spacer S1 may be approximately 3.40 to 6.17% with respect to the area of the uppermost part occupied by the entire spacers. The uppermost part may refer to a surface which may be closest to a substrate corresponding to a substrate on which the first spacer S1 is located The area of the uppermost part of the second spacer S2 may be approximately 4.44 to 9.02% with respect to the area of the uppermost part occupied by the entire spacers. The area of the uppermost part of the third spacer may be approximately 89.70 to 96.63% with respect to the area of the uppermost part occupied by the entire spacers.

Further, as the size of the liquid crystal display may be increased, the disposition density of the first spacer may be relatively decreased, and the disposition density of the third spacer may be relatively increased.

A difference of height between the first spacer S1, whose distance from the corresponding first display panel 100 may be the least, almost 0, and the third spacer whose distance from the corresponding first display panel 100 may be at most 0.6 µm to 1.5 µm. Further, the difference of height between the first spacer S1 and the second spacer S2 and the difference of height between the second spacer S2 and the third spacer may appropriately be selected according to the liquid crystal display. For example, the difference of height between the first spacer S1 and the second spacer S2 may be approximately 0.3 µm to 0.7 µm and the difference of height between the second spacer S2 and the third spacer may be approximately 0.3 µm to 0.7 µm.

In the exemplary embodiments, even though the widths of the first spacer S1 and the second spacer S2 may be different from each other, the widths of the first spacer S1 and the second spacer S2 may be equal to each other.

In the liquid crystal display according to the exemplary embodiments of the present invention, the spacers S1 and S2 may be disposed on the second display panel 200. However, in some cases, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, the first spacer S1 and the second spacer S2 may be disposed in the plurality of pixel areas. Therefore, as compared with the conventional liquid crystal display in which the first and second spacers may be disposed only in one pixel area, the disposition density of the spacer per pixel area may be lowered, which may prevent the pressure tolerance of the spacer from largely acting only on a specific pixel. As a result, the pressure tolerance of the spacers may uniformly be maintained for every pixel and may prevent the amount of dropping liquid crystal from being insufficient, and thus may prevent the light leakage may be caused by the insufficient liquid crystal.

Figure 13:
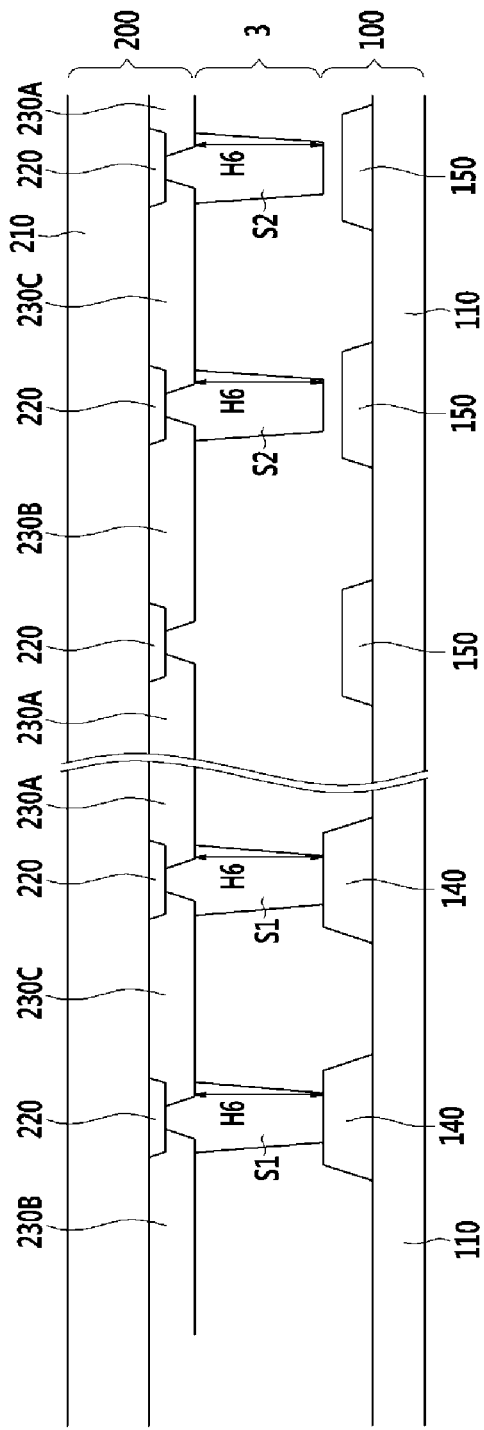
FIG. 13 is a schematic cross-sectional view of a liquid crystal display according to exemplary embodiments of the present invention.

Referring to FIG. 13, the liquid crystal display according to another exemplary embodiment of the present invention will be described. FIG. 13 is a schematic cross-sectional view of a liquid crystal display according to exemplary embodiments of the present invention.

The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers 140 and 150 disposed on the first substrate 110. The plurality of thin film layers may include a first part 140 that is relatively high and a second part 150 that is relatively low. The first part may be a position where a first signal line may extend in a first direction and a second signal line may extend in a second direction different from the first direction and may overlap with an insulating layer therebetween. The second part may be a part where any of signal lines may be disposed. The first part may be a position where a gate line overlaps a date line or a position where a storage electrode line overlaps a data line. The second part may be a part where any signal line of the gate line, the storage electrode line, and the data line may be disposed.

The second display panel 200 may include a second substrate 210, a light blocking member 220 may be disposed on the second substrate 210, and a plurality of color filters 230A, 230B, and 230C may be disposed on the light blocking member 220 and may display different colors. The color filters may filter light at different wavelengths corresponding to primary colors. Examples of the primary colors may include primary colors such as red, green, and blue, or yellow, cyan, or magenta. Although not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different distances from the plurality of thin film layers 140 and 150 of the first display panel 100 which face the spacers.

The first spacer S1 and the second spacer S2 may be disposed in two of a position corresponding to the first color filter 230A and the second color filter 230B of the plurality of color filters 230A, 230B, and 230C filtering light at different wavelengths corresponding to different colors and the light blocking member 220 between the two color filters 230A and 230, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A.

The first spacer S1 may contact both the first display panel 100 and the second display panel 200 and the cell gap of the liquid crystal display may be maintained by the first spacer S1. The second spacer S2 may be spaced apart from the corresponding first display panel 100 by a predetermined distance and may serve to maintain the cell gap of the liquid crystal display when a force with a larger pressure than the pressure tolerance of the first spacer S1 may be applied to the liquid crystal display. The second spacer S2 may have a higher disposition density per pixel area than the first spacer S1.

The first spacer S1 and the second spacer S2 may have almost the same height H6. However, the first spacer S1 may be disposed in a position corresponding to a higher part, the first part 140 of the plurality of thin film layers of the first display panel 100, and the second spacer S2 may be disposed in a position corresponding to a lower part, the second part 150 of the plurality of thin film layers of the first display panel 100. Therefore, the two spacers S1 and S2, which may have the same height, but may have different distances from the corresponding first display panel 100 depending on the height difference of the corresponding thin film layer disposed on the first display panel 100.

The exemplary embodiments of the present invention discloses that the height difference may be caused by the thin film included in the thin film layer may be disposed on the first display panel 100. However, the height difference of thin film layers may be disposed on the first display panel 100 may be controlled by the arrangement of an organic layer according to the position or formation of grooves according to the position. Therefore, the height of the thin film layer may be disposed on the first display panel 100 of the liquid crystal display according to another exemplary embodiment of the present invention may be controlled by the arrangement of the organic layer according to the position or the formation of the grooves according to the position.

Although not shown in the drawings, a third spacer may have a larger distance from the corresponding first display panel 100 than the first spacer S1 and the second spacer S2 may further be provided. The third spacer may be disposed in a position which may overlap at least two of a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A. The third spacer may have higher disposition density per pixel area than the first spacer S1 or the second spacer S2.

However, the third spacer may have almost the same height as the second spacer S2, but may have a different width or cross-sectional area from the second spacer S2.

The first spacer, the second spacer, and the third spacer may have different disposition density. The area of a surface of the uppermost part of the first spacer S1 may be approximately 3.40 to 6.17% with respect to the area of the uppermost part occupied by the entire spacers. The area of the uppermost part of the second spacer S2 may be approximately 4.44 to 9.02% with respect to the area of the uppermost part occupied by the entire spacers. The uppermost part may refer to a surface which may be closest to a substrate opposite to a substrate on which the first spacer S1 is located. The area of the uppermost part of the third spacer may be approximately 89.70 to 96.63% with respect to the area of the uppermost part occupied by the entire spacers.

Further, as the size of the liquid crystal display is increased, the disposition density of the first spacer may be relatively decreased, and the disposition density of the third spacer may be relatively increased.

A difference between the distance from the first display panel 100 to the first spacer S1, which distance from the corresponding first display panel 100 may be the least, almost 0 and the distance from the first display panel 100 to the third spacer, which distance from the corresponding first display panel 100 may be maximum at most 0.6 μm to 1.5 μm. Further, the difference between the distance from the first display panel 100 to the first spacer S1 and the distance from the first display panel 100 to the second spacer S2 and the difference between the distance from the first display panel 100 to the second spacer S2 and the distance from the first display panel 100 to the third spacer may be appropriately selected according to the liquid crystal display. For example, the difference between the distance from the first display panel 100 to the first spacer S1 and the distance from the first display panel 100 to the second spacer S2 may be approximately 0.3 μm to 0.7 μm and the difference between the distance from the first display panel 100 to the second spacer S2 and the distance from the first display panel 100 to the third spacer may be approximately 0.3 μm to 0.7 μm.

In the exemplary embodiments, although the widths of the first spacer S1 and the second spacer S2 may equal to each other, the widths of the first spacer S1 and the second spacer S2 may be different from each other.

Further, according to the exemplary embodiments of the present invention, the first spacer S1 may be disposed so as to correspond to two of a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A. The second spacer S2 may be disposed so as to correspond to any one of a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A.

In the liquid crystal display according to the exemplary embodiments of the present invention, the spacers S1 and S2 may be disposed on the second display panel 200. However, in the liquid crystal display according to another exemplary embodiment of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, the liquid crystal display according to the exemplary embodiments of the present invention, the first spacer and the second spacer may be disposed in the plurality of pixel areas. Therefore, as compared with the liquid crystal display according to the prior art in which the first and second spacers may be disposed only in one pixel area, the disposition density of the spacer per pixel area may be lowered, which may prevent the pressure tolerance of the spacer from largely acting only on a specific pixel. As a result, the pressure tolerance of the spacers may uniformly be maintained for every pixel and may prevent the amount of dropping liquid crystal from being insufficient, and may prevent the light leakage may be caused by the insufficient liquid crystal.

Figure 14:
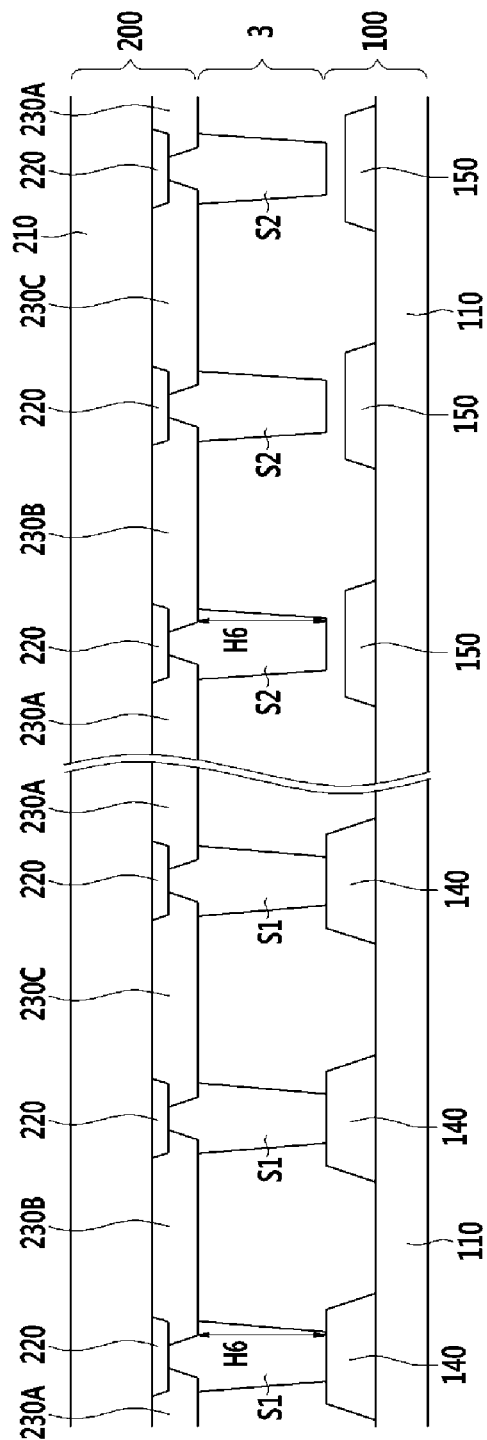
FIG. 14 is a schematic cross-sectional view of a liquid crystal display according to exemplary embodiments of the present invention.

Referring to FIG. 14, the liquid crystal display according to another exemplary embodiment of the present invention will be described. FIG. 14 is a schematic cross-sectional view of a liquid crystal display according to exemplary embodiments of the present invention.

The liquid crystal display according to the exemplary embodiments of the present invention may have the similar structure to the liquid crystal display of the above-described exemplary embodiments. The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers 140 and 150 may be disposed on the first substrate 110. The plurality of thin film layers may include a first part 140 that is relatively high and a second part 150 that is relatively low. The first part may be a position where a first signal line may extend in a first direction and a second signal line which may extend in a second direction different from the first direction and may overlap with an insulating layer therebetween. The second part may be a part where any of signal lines may be disposed. The first part may be a position where a gate line may overlap a date line or a position where a storage electrode line overlaps a data line. The second part may be a part where any signal line of the gate line, the storage electrode line, and the data line may be disposed.

The exemplary embodiments discloses that the height difference may be caused by the thin film included in the thin film layer and may be disposed on the first display panel 100. However, the height difference of thin film layers may be disposed on the first display panel 100 and may be controlled by the arrangement of an organic layer according to the position or formation of grooves according to the position. Therefore, the height of the thin film layer may be disposed on the first display panel 100 of the liquid crystal display according to another exemplary embodiment of the present invention may be controlled by the arrangement of the organic layer according to the position or the formation of the grooves according to the position.

The second display panel 200 may include a second substrate 210, a light blocking member 220 may be disposed on the second substrate 210, and a plurality of color filters 230A, 230B, and 230C may be disposed on the light blocking member 220 and may display different colors. The color filters may filter light at different wavelengths corresponding to primary colors. Examples of the primary colors may include three primary colors such as red, green, and blue, or yellow, cyan, or magenta. Although not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different distances from the plurality of thin film layers 140 and 150 of the first display panel 100 which face the spacers.

The first spacer S1 and the second spacer S2 may be disposed to overlap a position corresponding to the first color filter 230A and the second color filter 230B of the plurality of color filters 230A, 230B, and 230C filtering light at different wavelengths corresponding to different colors and the light blocking member 220 between the two color filters 230A and 230, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A.

The first spacer S1 may contact both the first display panel 100 and the second display panel 200 so that the cell gap of the liquid crystal display may be maintained by the first spacer S1. The second spacer S2 may be spaced apart from the corresponding first display panel 100 by a predetermined distance and may serve to maintain the cell gap of the liquid crystal display when a force with a larger pressure than the pressure tolerance of the first spacer S1 may be applied to the liquid crystal display. The second spacer S2 may have a higher disposition density per pixel area than the first spacer S1.

The first spacer S1 and the second spacer S2 may have almost the same height H6. However, the first spacer S1 may be disposed in a position corresponding to a higher part, for example, the first part 140 of the plurality of thin film layers of the first display panel 100, and the second spacer S2 may be disposed in a position corresponding to a lower part, for example, the second part 150 of the plurality of thin film layers of the first display panel 100. Therefore, the two spacers S1 and S2, which may have the same height, may have different distances from the corresponding first display panel 100 may depend upon the height difference of the corresponding thin film layer may be disposed on the first display panel 100.

Although not shown in the drawings, a third spacer may have a larger distance from the corresponding first display panel 100 than the first spacer S1 and the second spacer S2 may further be provided. The third spacer may be disposed and may overlap a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A. The third spacer may have higher disposition density per pixel area than the first spacer S1 or the second spacer S2.

However, the third spacer may have almost the same height as the second spacer S2, but may have a different width or cross-sectional area from the second spacer S2.

The first spacer, the second spacer, and the third spacer may have different disposition density. The area of the uppermost part of the first spacer S1 may be approximately 3.40 to 6.17% with respect to the area of the uppermost part occupied by the entire spacers. The uppermost part may refer to a surface which may be closest to a substrate opposite to a substrate on which the first spacer S1 is located. The area of the uppermost part of the second spacer S2 may be approximately 4.44 to 9.02% with respect to the area of the uppermost part occupied by the entire spacers. The area of the uppermost part of the third spacer may be approximately 89.70 to 96.63% with respect to the area of the uppermost part occupied by the entire spacers.

Further, as the size of the liquid crystal display may be increased, the disposition density of the first spacer may be relatively decreased, and the disposition density of the third spacer may be relatively increased.

A difference between the distance from the first display panel 100 to the first spacer S1, whose distance from the corresponding first display panel 100 may be the least, almost 0 and the distance from the first display panel 100 to the third spacer, whose distance from the corresponding first display panel 100 may be at most 0.6 µm to 1.5 µm. Further, the difference between the distance from the first display panel 100 to the first spacer S1 and the distance from the first display panel 100 to the second spacer S2 and the difference between the distance from the first display panel 100 to the second spacer S2 and the distance from the first display panel 100 to the third spacer may be appropriately selected according to the liquid crystal display. For example, the difference between the distance from the first display panel 100 to the first spacer S1 and the distance from the first display panel 100 to the second spacer S2 may be approximately 0.3 µm to 0.7 µm and the difference between the distance from the first display panel 100 to the second spacer S2 and the distance from the first display panel 100 to the third spacer may be approximately 0.3 µm to 0.7 µm.

In the exemplary embodiments, although the widths of the first spacer S1 and the second spacer S2 may equal to each other, the widths of the first spacer S1 and the second spacer S2 may be different from each other.

In the liquid crystal display according to the exemplary embodiments of the present invention, the spacers S1 and S2 may be disposed on the second display panel 200. However, in the liquid crystal display according to another exemplary embodiment of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, according to the liquid crystal display of the exemplary embodiments of the present invention, the first spacer and the second spacer may be disposed in the plurality of pixel areas. Therefore, as compared with the conventional liquid crystal display in which the first and second spacers may be disposed only in one pixel area, the disposition density of the spacer per pixel area may be lowered, which may prevent the pressure tolerance of the spacer from largely acting only on a specific pixel. As a result, the pressure tolerance of the spacers may uniformly be maintained for every pixel and may prevent the amount of dropping liquid crystal from being insufficient, and thus may prevent the light leakage may be caused by the insufficient liquid crystal.

Figure 15:
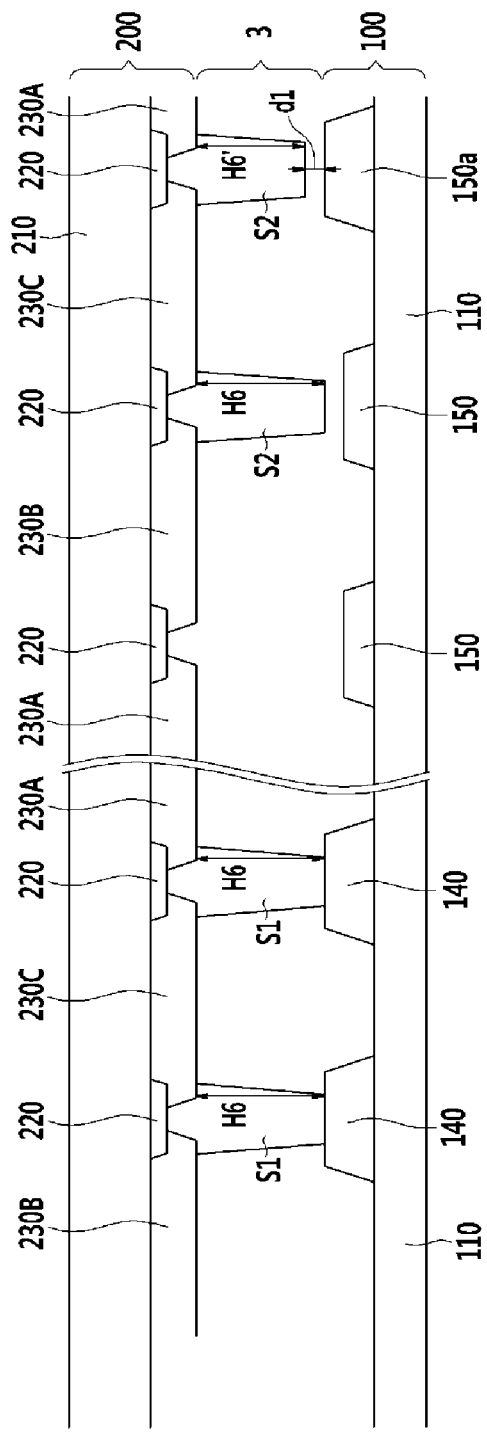
FIG. 15 is a schematic cross-sectional view of a liquid crystal display according to exemplary embodiments of the present invention.

Referring to FIG. 15, the liquid crystal display according to another exemplary embodiment of the present invention will be described. FIG. 15 is a schematic cross-sectional view of a liquid crystal display according to exemplary embodiments of the present invention.

The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers 140 and 150 may be disposed on the first substrate 110. The plurality of thin film layers may include a first part 140 that is relatively high and a second part 150 that is relatively low. The first part may be a position where a first signal line may extend in a first direction and a second signal line may extend in a second direction may be different from the first direction and may overlap with an insulating layer therebetween. The second part may be a part where any of signal lines may be disposed. The first part may be a position where a gate line overlaps a date line or a position where a storage electrode line overlaps a data line. The second part may be a part where any signal line of the gate line, the storage electrode line, and the data line may be disposed.

The exemplary embodiments discloses that the height difference is caused by the thin film included in the thin film layer may be disposed on the first display panel 100. However, the height difference of thin film layers may be disposed on the first display panel 100 may be controlled by the arrangement of an organic layer according to the position or formation of grooves according to the position. Therefore, the height of the thin film layer may be disposed on the first display panel 100 of the liquid crystal display according to another exemplary embodiment of the present invention may be controlled by the arrangement of the organic layer according to the position or the formation of the grooves according to the position.

The second display panel 200 may include a second substrate 210, a light blocking member 220 may be disposed on the second substrate 210, and a plurality of color filters 230A, 230B, and 230C may be disposed on the light blocking member 220 and may display different colors. The color filters may filter light at different wavelengths corresponding to primary colors. Examples of the primary colors may include three primary colors such as red, green, and blue, or yellow, cyan, or magenta. Although not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different distances from the plurality of thin film layers 140 and 150 of the first display panel 100 which face the spacers.

The first spacer S1 and the second spacer S2 may be disposed in two of a position corresponding to the first color filter 230A and the second color filter 230B of the plurality of color filters 230A, 230B, and 230C filtering light at different wavelengths corresponding to different colors and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A.

The first spacer S1 may contact both the first display panel 100 and the second display panel 200 so that the cell gap of the liquid crystal display may be maintained by the first spacer S1. The second spacer S2 may be spaced apart from the corresponding first display panel 100 by a predetermined distance and may serve to maintain the cell gap of the liquid crystal display when a force with a larger pressure than the pressure tolerance of the first spacer S1 may be applied to the liquid crystal display. The second spacer S2 may have a higher disposition density per pixel area than the first spacer S1.

The first spacer S1 and the second spacer S2 may be disposed in a position corresponding to the second color filter 230B and the third color filter 230C of the plurality of color filters 230A, 230B, and 230C filtering light at different wavelengths corresponding to different colors and the light blocking member 220 between the two color filters 230B and 230C have almost the same height H6. However, the first spacer S1 may be disposed in a position corresponding to a higher part, for example, the first part 140 of the plurality of thin film layers of the first display panel 100, and the second spacer S2 may be disposed in a position corresponding to a lower part, for example, the second part 150 of the plurality of thin film layers of the first display panel 100. Therefore, the two spacers S1 and S2, which have the same height, may have different distances from the corresponding first display panel 100 depending upon the height difference of the corresponding thin film layer may be disposed on the first display panel 100.

The first spacer S1 and the second spacer S2 may be disposed in a position corresponding to the third color filter 230C and the first color filter 230A of the plurality of color filters 230A, 230B, and 230C filtering light at different wavelengths corresponding to different colors and the light blocking member 220 between the two color filters 230C and 230A have different heights H6 and H6'. Further, the plurality of thin film layers 140 and 150a of the first display panel 100 corresponding to the first spacer S1 and the second spacer S2 may have almost the same height. Therefore, the distances from the first spacer and the second spacer to the corresponding first display panel 100 may be varied depending on the height difference of the first spacer S1 and the second spacer S2.

Although not shown in the drawings, a third spacer which may have a larger distance from the corresponding first display panel 100 than the first spacer S1 and the second spacer S2 may further be provided. The third spacer may be disposed so as to overlap at least two of a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A. The third spacer may have higher disposition density per pixel area than the first spacer S1 or the second spacer S2.

However, the third spacer may have almost the same height as the second spacer S2, but a different width or cross-sectional area from the second spacer S2.

The first spacer, the second spacer, and the third spacer may have different disposition density. The area of the uppermost part of the first spacer S1 may be approximately 3.40 to 6.17% with respect to the area of the uppermost part occupied by the entire spacers. The uppermost part may refer to a surface which may be closest to a substrate opposite to a substrate on which the first spacer S1 is located. The area of the uppermost part of the second spacer S2 may be approximately 4.44 to 9.02% with respect to the area of the uppermost part occupied by the entire spacers. The area of the uppermost part of the third spacer may be approximately 89.70 to 96.63% with respect to the area of the uppermost part occupied by the entire spacers.

Further, as the size of the liquid crystal display is increased, the disposition density of the first spacer may be relatively decreased, and the disposition density of the third spacer may be relatively increased.

A difference between the distance from the first display panel 100 to the first spacer S1, whose distance from the corresponding first display panel 100 may be the least, almost 0, and the distance from the first display panel 100 to the third spacer, whose distance from the corresponding first display panel 100 may be at most 0.6 µm to 1.5 µm. Further, the difference between the distance from the first display panel 100 to the first spacer S1 and the distance from the first display panel 100 to the second spacer S2 and the difference between the distance from the first display panel 100 to the second spacer S2 and the distance from the first display panel 100 to the third spacer may be appropriately selected according to the liquid crystal display. For example, the difference between the distance from the first display panel 100 to the first spacer S1 and the distance from the first display panel 100 to the second spacer S2 may be approximately 0.3 µm to 0.7 µm and the difference between the distance from the first display panel 100 to the second spacer S2 and the distance from the first display panel 100 to the third spacer may be approximately 0.3 µm to 0.7 µm.

In the exemplary embodiments, although the widths of the first spacer S1 and the second spacer S2 may equal to each other, the widths of the first spacer S1 and the second spacer S2 may be different from each other.

Further, according to another exemplary embodiment of the present invention, the first spacer S1 may be disposed correspond to two of a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A. The second spacer S2 may be disposed correspond to any one of a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A.

In the liquid crystal display according to the exemplary embodiments of the present invention, the spacers S1 and S2 may be disposed in the second display panel 200. However, in the liquid crystal display according to another exemplary embodiment of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, according to the liquid crystal display of the exemplary embodiments of the present invention, the first spacer and the second spacer may be disposed in the plurality of pixel areas. Therefore, as compared with the conventional liquid crystal display in which the first and second spacers may be disposed only in one pixel area, the disposition density of the spacer per pixel area is lowered, which may prevent the pressure tolerance of the spacer from largely acting only on a specific pixel. As a result, the pressure tolerance of the spacers may uniformly be maintained for every pixel and may prevent the amount of dropping liquid crystal from being insufficient, and may prevent the light leakage may be caused by the insufficient liquid crystal.

Figure 16:
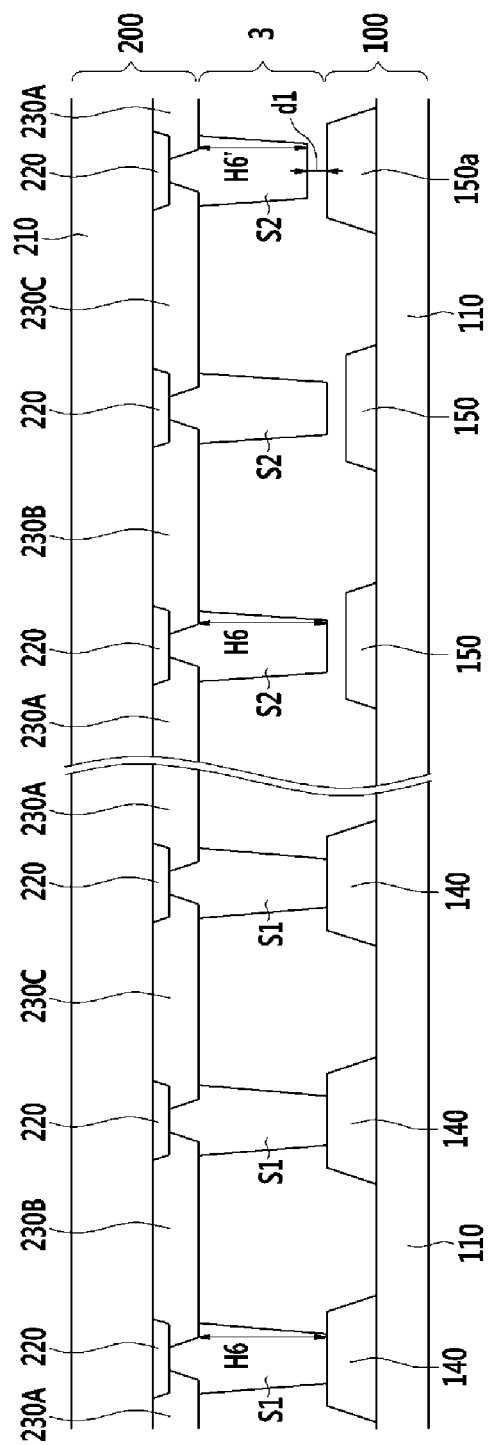
FIG. 16 is a schematic cross-sectional view of a liquid crystal display according to exemplary embodiments of the present invention.

Referring to FIG. 16, the liquid crystal display according to another exemplary embodiment of the present invention will be described. FIG. 16 is a schematic cross-sectional view of a liquid crystal display according to exemplary embodiments of the present invention.

The liquid crystal display according to the exemplary embodiments of the present invention has the similar structure to the liquid crystal display of the above-described exemplary embodiments. The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers 140 and 150 may be disposed on the first substrate 110. The plurality of thin film layers may include a first part 140 that is relatively high and a second part 150 that is relatively low. The first part may be a position where a first signal line may extend in a first direction and a second signal line may extend in a second direction different from the first direction overlap with an insulating layer therebetween. The second part may be a part where any of signal lines may be disposed. The first part may be a position where a gate line overlaps a date line or a position where a storage electrode line overlaps a data line. The second part may be a part where any signal line of the gate line, the storage electrode line, and the data line may be disposed.

The exemplary embodiments discloses that the height difference may be caused by the thin film included in the thin film layer, may be disposed on the first display panel 100. However, the height difference of thin film layers may be disposed on the first display panel 100 may be controlled by the arrangement of an organic layer according to the position or formation of grooves according to the position. Therefore, the height of the thin film layer may be disposed on the first display panel 100 of the liquid crystal display according to another exemplary embodiment of the present invention may be controlled by the arrangement of the organic layer according to the position or the formation of the grooves according to the position.

The second display panel 200 may include a second substrate 210, a light blocking member 220 may be disposed on the second substrate 210, and a plurality of color filters 230A, 230B, and 230C may be disposed on the light blocking member 220 and displaying different colors. The color filters may filter light at different wavelengths corresponding to primary colors. Examples of the primary colors may include primary colors such as red, green, and blue, or yellow, cyan, or magenta. Although not shown in the drawings, the color filter may further include color filters that filter light at different wavelengths corresponding to a display of mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different distances from the plurality of thin film layers 140 and 150 of the first display panel 100 which face the spacers.

The first spacer S1 may contact both the first display panel 100 and the second display panel 200 and the cell gap of the liquid crystal display may be maintained by the first spacer S1. The second spacer S2 may be spaced apart from the corresponding first display panel 100 by a predetermined distance d1 and may server to maintain the cell gap of the liquid crystal display when a force with a larger pressure than the pressure tolerance of the first spacer S1 may be applied to the liquid crystal display. The second spacer S2 may have a higher disposition density per pixel area than the first spacer S1.

The first spacer S1 and the second spacer S2 may be disposed in a position which may correspond to the first color filter 230A and the second color filter 230B of the plurality of color filters 230A, 230B, and 230C filtering light at different wavelengths corresponding to different colors and the light blocking member 220 between the two color filters 230A and 230B and a position which may correspond to the second color filter 230B and the third color filter 230C and the light blocking member 220 between the two color filters 230B and 230C have almost the same height H6. However, the first spacer S1 may be disposed in a position which may correspond to a higher part, e.g., the first part 140 of the plurality of thin film layers of the first display panel 100, and the second spacer S2 may be disposed in a position which may correspond to a lower part, e.g., the second part 150 of the plurality of thin film layers of the first display panel 100. Therefore, the two spacers S1 and S2, which may have the same height, may have different distances from the corresponding first display panel 100 which may depend upon the height difference of the corresponding thin film layer and may be disposed on the first display panel 100.

The first spacer S1 and the second spacer S2 may be disposed in a position corresponding to the third color filter 230C and the first color filter 230A of the plurality of color filters 230A, 230B, and 230C filtering light at different wavelengths corresponding to different colors and the light blocking member 220 between the two color filters 230C and 230A have different heights H6 and H6'. Further, the plurality of thin film layers 140 and 150a of the first display panel 100 corresponding to the first spacer S1 and the second spacer S2 may have almost the same height. Therefore, the distances from the first spacer and the second spacer to the corresponding first display panel 100 may be varied depending upon the height difference of the first spacer S1 and the second spacer S2.

Although not shown in the drawings, a third spacer has a larger distance from the corresponding first display panel 100 than the first spacer S1 and the second spacer S2 may further be provided. The third spacer may be disposed and may overlap a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A. The third spacer may have higher disposition density per pixel area than the first spacer S1 or the second spacer S2.

However, the third spacer may have almost the same height as the second spacer S2, but may have a different width or cross-sectional area from the second spacer S2.

The first spacer, the second spacer, and the third spacer may have different disposition density. An area of the uppermost part of the first spacer S1 may be approximately 3.40 to 6.17% with respect to the area of the uppermost part occupied by the entire spacers. The area of the uppermost part of the second spacer S2 may be approximately 4.44 to 9.02% with respect to the area of the uppermost part occupied by the entire spacers. The uppermost part may refer to a surface which may be closest to a substrate opposite to a substrate on which the first spacer S1 is located. The area of the uppermost part of the third spacer may be approximately 89.70 to 96.63% with respect to the area of the uppermost part occupied by the entire spacers.

Further, as the size of the liquid crystal display is increased, the disposition density of the first spacer may be relatively decreased, and the disposition density of the third spacer may be relatively increased.

A difference between the distance from the first display panel 100 to the first spacer S1, whose distance from the corresponding first display panel 100 may be the least, almost 0, and the distance from the first display panel 100 to the third spacer, whose distance from the corresponding first display panel 100 may be at most 0.6 μm to 1.5 μm. Further, the difference between the distance from the first display panel 100 to the first spacer S1 and the distance from the first display panel 100 to the second spacer S2 and the difference between the distance from the first display panel 100 to the second spacer S2 and the distance from the first display panel 100 to the third spacer can be appropriately selected according to the liquid crystal display. For example, the difference between the distance from the first display panel 100 to the first spacer S1 and the distance from the first display panel 100 to the second spacer S2 may be approximately 0.3 μm to 0.7 μm and the difference between the distance from the first display panel 100 to the second spacer S2 and the distance from the first display panel 100 to the third spacer may be approximately 0.3 μm to 0.7 μm.

In the exemplary embodiments, although the widths of the first spacer S1 and the second spacer S2 may equal to each other, the widths of the first spacer S1 and the second spacer S2 may be different from each other.

In the liquid crystal display according to the exemplary embodiments of the present invention, the spacers S1 and S2 may be disposed on the second display panel 200. However, in the liquid crystal display according to another exemplary embodiment of the present invention, the spacers may be disposed on the first display panel 100. Further, the color filters and the spacers may be disposed on different display panels.

As described above, according to the liquid crystal display of the exemplary embodiments of the present invention, the first spacer and the second spacer may be disposed in the plurality of pixel areas. Therefore, as compared with the liquid crystal display according to the prior art in which the first and second spacers may be disposed only in one pixel area, the disposition density of the spacer per pixel area is lowered, which may prevent the pressure tolerance of the spacer from largely acting only on a specific pixel. As a result, the pressure tolerance of the spacers may uniformly be maintained for every pixel and may prevent the amount of dropping liquid crystal from being insufficient, and may prevent the light leakage may be caused by the insufficient liquid crystal.

Figure 17:
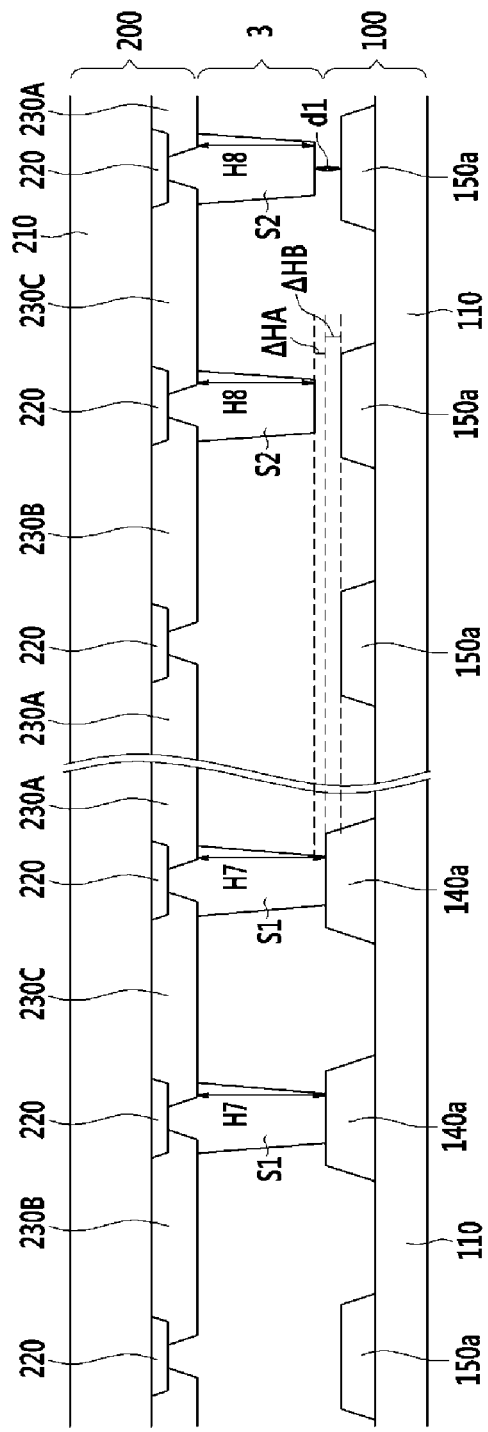
FIG. 17 is a schematic cross-sectional view of a liquid crystal display according to exemplary embodiments of the present invention.

Referring to FIG. 17, the liquid crystal display according to another exemplary embodiment of the present invention will be described. FIG. 17 is a schematic cross-sectional view of a liquid crystal display according to exemplary embodiments of the present invention.

The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers 140a and 150a may be disposed on the first substrate 110. The plurality of thin film layers may include a first part 140a that is relatively high and a second part 150a that is relatively low. The first part 140a may be a position where a first signal line may extend in a first direction and a second signal line may extend in a second direction different from the first direction overlap with an insulating layer therebetween. The second part 150a may be a part where any of signal lines may be disposed. The first part 140a may be a position where a gate line overlaps a date line or a position where a storage electrode lines overlap a data line. The second part 150a may be a part where any signal line of the gate line, the storage electrode line, and the data line may be disposed.

The exemplary embodiments discloses that the height difference is caused by the thin film included in the thin film layer may be disposed on the first display panel 100. However, the height difference of thin film layers may be disposed on the first display panel 100 may be controlled by the arrangement of an organic layer according to the position or formation of grooves according to the position. Therefore, the height of the thin film layer may be disposed on the first display panel 100 of the liquid crystal display according to another exemplary embodiment of the present invention may be controlled by the arrangement of the organic layer according to the position or the formation of the grooves according to the position.

The second display panel 200 may include a second substrate 210, a light blocking member 220 may be disposed on the second substrate 210, and a plurality of color filters 230A, 230B, and 230C may be disposed on the light blocking member 220 and displaying different colors. The color filters may filter light at different wavelengths corresponding to primary colors. Examples of the primary colors include three primary colors such as red, green, and blue, or yellow, cyan, or magenta. Although not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different distances from the plurality of thin film layers 140a and 150a of the first display panel 100 which face the spacers.

The first spacer S1 and the second spacer S2 may be disposed in two of a position corresponding to the first color filter 230A and the second color filter 230B of the plurality of color filters 230A, 230B, and 230C filtering light at different wavelengths corresponding to different colors and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A.

The first spacer S1 may contact with both the first display panel 100 and the second display panel 200 so that the cell gap of the liquid crystal display may be maintained by the first spacer S1. The second spacer S2 may be spaced apart from the corresponding first display panel 100 by a predetermined distance and may serve to maintain the cell gap of the liquid crystal display when a force with a larger pressure than the pressure tolerance of the first spacer S1 may be applied to the liquid crystal display. The second spacer S2 may a have higher disposition density per pixel area than the first spacer S1.

The first spacer S1 and the second spacer S2 may have different heights H7 and H8. Further, the plurality of thin film layers 140a and 150a of the first display panel 100 may correspond to the first spacer S1 and the second spacer S2 may have different heights. Accordingly, the distance from the first spacer S1 and the second spacer S2 to the corresponding first display panel 100 may vary depending upon the sum of the height difference ΔHA between the first spacer S1 and the second spacer S2 and the height difference ΔHB of the plurality of thin film layers 120a' and 120b' of the first display panel 100 which may correspond to the first spacer S1 and the second spacer S2.

Even though not shown in the drawings, a third spacer has a larger distance from the corresponding first display panel 100 than the first spacer S1 and the second spacer S2 may further be provided. The third spacer may be disposed overlap at least two of a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A. The third spacer may have higher disposition density per pixel area than the first spacer S1 or the second spacer S2.

However, the third spacer may have almost the same height as the second spacer S2, but may have a different width or cross-sectional area from the second spacer S2.

The first spacer, the second spacer, and the third spacer may have different disposition density. An area of the uppermost part of the first spacer S1 may be approximately 3.40 to 6.17% with respect to the area of the uppermost part occupied by the entire spacers. The area of the uppermost part of the second spacer S2 may be approximately 4.44 to 9.02% with respect to the area of the uppermost part occupied by the entire spacers. The uppermost part may refer to a surface which may be closest to a substrate opposite to a substrate on which the first spacer S1 is located. The area of the uppermost part of the third spacer may be approximately 89.70 to 96.63% with respect to the area of the uppermost part occupied by the entire spacers.

Further, as the size of the liquid crystal display is increased, the disposition density of the first spacer may be relatively decreased, and the disposition density of the third spacer may be relatively increased.

A difference between the distance from the first display panel 100 to the first spacer S1, whose distance from the corresponding first display panel 100 may be the least, almost 0 and the distance from the first display panel 100 to the third spacer, whose distance from the corresponding first display panel 100 may be at most 0.6 μm to 1.5 μm. Further, the difference between the distance from the first display panel 100 to the first spacer S1 and the distance from the first display panel 100 to the second spacer S2 and the difference between the distance from the first display panel 100 to the second spacer S2 and the distance from the first display panel 100 to the third spacer may be appropriately selected according to the liquid crystal display. For example, the difference between the distance from the first display panel 100 to the first spacer S1 and the distance from the first display panel 100 to the second spacer S2 may be approximately 0.3 μm to 0.7 μm and the difference between the distance from the first display panel 100 to the second spacer S2 and the distance from the first display panel 100 to the third spacer may be approximately 0.3 μm to 0.7 μm.

In the exemplary embodiments, even though the widths of the first spacer S1 and the second spacer S2 may equal to each other, the widths of the first spacer S1 and the second spacer S2 may be different from each other.

Further, according to the exemplary embodiments of the present invention, the first spacer S1 may be disposed so as to correspond to two of a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A. The second spacer S2 may be disposed so as to correspond to any one of a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A.

In the liquid crystal display according to the exemplary embodiments of the present invention, the spacers S1 and S2 may be disposed in the second display panel 200. However, in the liquid crystal display according to another exemplary embodiment of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, according to the liquid crystal display of the exemplary embodiments of the present invention, the first spacer and the second spacer may be disposed in the plurality of pixel areas. Therefore, as compared with the liquid crystal display according to the prior art in which the first and second spacers are disposed only in one pixel area, the disposition density of the spacer per pixel area is lowered, which may prevent the pressure tolerance of the spacer from largely acting only on a specific pixel. As a result, the pressure tolerance of the spacers may uniformly be maintained for every pixel and prevent the amount of dropping liquid crystal from being insufficient, and may prevent the light leakage may be caused by the insufficient liquid crystal.

Figure 18:
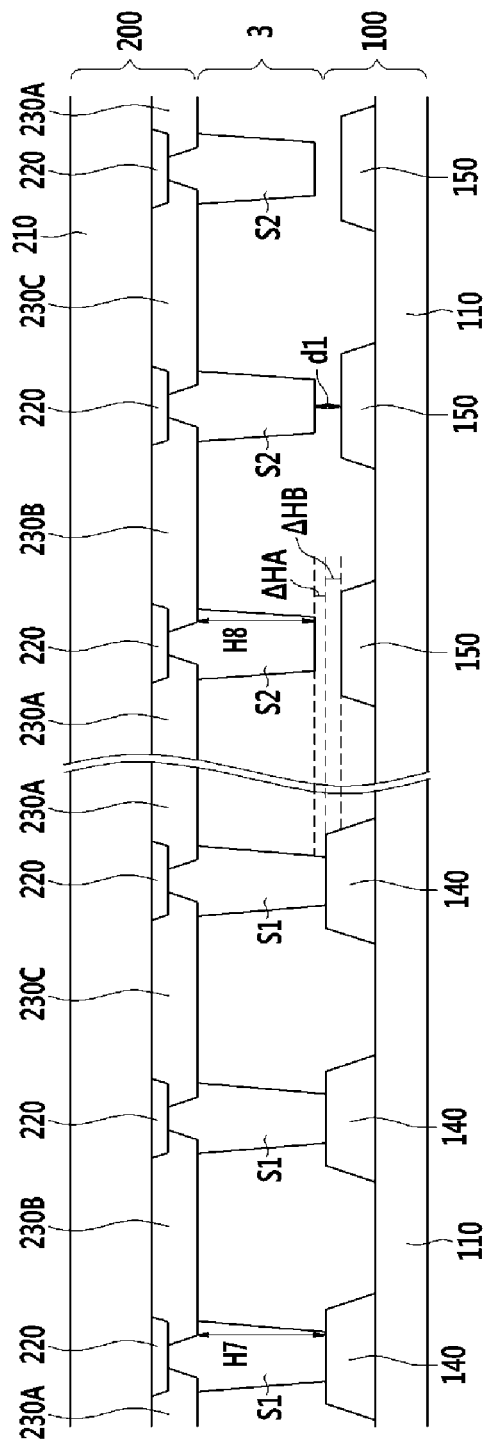
FIG. 18 is a schematic cross-sectional view of a liquid crystal display according to exemplary embodiments of the present invention.

Referring to FIG. 18, the liquid crystal display according to another exemplary embodiment of the present invention will be described. FIG. 18 is a schematic cross-sectional view of a liquid crystal display according to exemplary embodiments of the present invention.

The liquid crystal display according to the exemplary embodiments of the present invention may have the similar structure to the liquid crystal display of the above-described exemplary embodiments. The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers 140a and 150a may be disposed on the first substrate 110. The plurality of thin film layers may include a first part 140a that is relatively high and a second part 150a that is relatively low. The first part 140a may be a position where a first signal line may extend in a first direction and a second signal line may extend in a second direction different from the first direction overlap with an insulating layer therebetween. The second part 150a may be a part where any of signal lines may be disposed. The first part 140a may be a position where a gate line overlaps a date line or a position where a storage electrode lines overlap a data line. The second part 150a may be a part where any signal line of the gate line, the storage electrode line, and the data line may be disposed.

The exemplary embodiments discloses that the height difference may be caused by the thin film which may be included in the thin film layer and may be disposed on the first display panel 100. However, the height difference of thin film layers may be disposed on the first display panel 100 may be controlled by the arrangement of an organic layer according to the position or formation of grooves according to the position. Therefore, the height of the thin film layer may be disposed on the first display panel 100 of the liquid crystal display according to another exemplary embodiment of the present invention may be controlled by the arrangement of the organic layer according to the position or the formation of the grooves according to the position.

The second display panel 200 may include a second substrate 210, a light blocking member 220 may be disposed on the second substrate 210, and a plurality of color filters 230A, 230B, and 230C may be disposed on the light blocking member 220 and displaying different colors. The color filters may filter light at different wavelengths corresponding to primary colors. Examples of the primary colors may include primary colors such as red, green, and blue, or yellow, cyan, or magenta. Even though not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different distances from the plurality of thin film layers 140 and 150 of the first display panel 100 which face the spacers.

The first spacer S1 may contact with both the first display panel 100 and the second display panel 200 so that the cell gap of the liquid crystal display may be maintained by the first spacer S1. The second spacer S2 may be spaced apart from the corresponding first display panel 100 by a predetermined distance and may serve to maintain the cell gap of the liquid crystal display when a force with a larger pressure than the pressure tolerance of the first spacer S1 may be applied to the liquid crystal display. The second spacer S2 may a have higher disposition density per pixel area than the first spacer S1.

The first spacer S1 and the second spacer S2 may have different heights H7 and H8 respectively. Further, the plurality of thin film layers 140a and 150a of the first display panel 100 corresponding to the first spacer S1 and the second spacer S2 have different heights. Accordingly, the distance from the first spacer S1 and the second spacer S2 to the corresponding first display panel 100 is varied and depend upon the sum of the height difference ΔHA between the first spacer S1 and the second spacer S2 and the height difference ΔHB of the plurality of thin film layers 120a' and 120b' of the first display panel 100 corresponding to the first spacer S1 and the second spacer S2.

Although not shown in the drawings, a third spacer, that has a larger distance from the corresponding first display panel 100 than the first spacer S1 and the second spacer S2 may further be provided. The third spacer may be disposed overlap a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A. The third spacer may have higher disposition density per pixel area than the first spacer S1 or the second spacer S2.

However, the third spacer may have almost the same height as the second spacer S2, but may have a different width or cross-sectional area from the second spacer S2.

The first spacer, the second spacer, and the third spacer may have different disposition density. An area of the uppermost part may be approximately 3.40 to 6.17% with respect to the area of the uppermost part which may be occupied by the entire spacers. The uppermost part may refer to a surface which may be closest to a substrate opposite to a substrate on which the first spacer S1 is located. The area of the uppermost part of the second spacer S2 may be approximately 4.44 to 9.02% with respect to the area of the uppermost part which may be occupied by the entire spacers. The area of the uppermost part of the third spacer may be approximately 89.70 to 96.63% with respect to the area of the uppermost part occupied by the entire spacers.

Further, as the size of the liquid crystal display is increased, the disposition density of the first spacer may be relatively decreased, and the disposition density of the third spacer may be relatively increased.

A difference between the distance from the first display panel 100 to the first spacer S1, whose distance from the corresponding first display panel 100 may be the least, almost 0 and the distance from the first display panel 100 to the third spacer, whose distance from the corresponding first display panel 100 at most 0.6 µm to 1.5 µm. Further, the difference between the distance from the first display panel 100 to the first spacer S1 and the distance from the first display panel 100 to the second spacer S2 and the difference between the distance from the first display panel 100 to the second spacer S2 and the distance from the first display panel 100 to the third spacer may appropriately be selected according to the liquid crystal display. For example, the difference between the distance from the first display panel 100 to the first spacer S1 and the distance from the first display panel 100 to the second spacer S2 may be approximately 0.3 µm to 0.7 µm and the difference between the distance from the first display panel 100 to the second spacer S2 and the distance from the first display panel 100 to the third spacer may be approximately 0.3 µm to 0.7 µm.

In the exemplary embodiments, even though the widths of the first spacer S1 and the second spacer S2 may equal to each other, the widths of the first spacer S1 and the second spacer S2 may be different from each other.

In the liquid crystal display according to the exemplary embodiments of the present invention, the spacers S1 and S2 may be disposed on the second display panel 200. However, in the liquid crystal display according to another exemplary embodiment of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, the liquid crystal display according to the exemplary embodiments of the present invention, the first spacer and the second spacer may be disposed in the plurality of pixel areas. Therefore, as compared with the liquid crystal display according to the prior art in which the first and second spacers are disposed only in one pixel area, the disposition density of the spacer per pixel area is lowered, which may prevent the pressure tolerance of the spacer from largely acting only on a specific pixel. As a result, the pressure tolerance of the spacers may uniformly be maintained for every pixel and may prevent the amount of dropping liquid crystal from being insufficient, and may prevent the light leakage may be caused by the insufficient liquid crystal.

Figure 19:
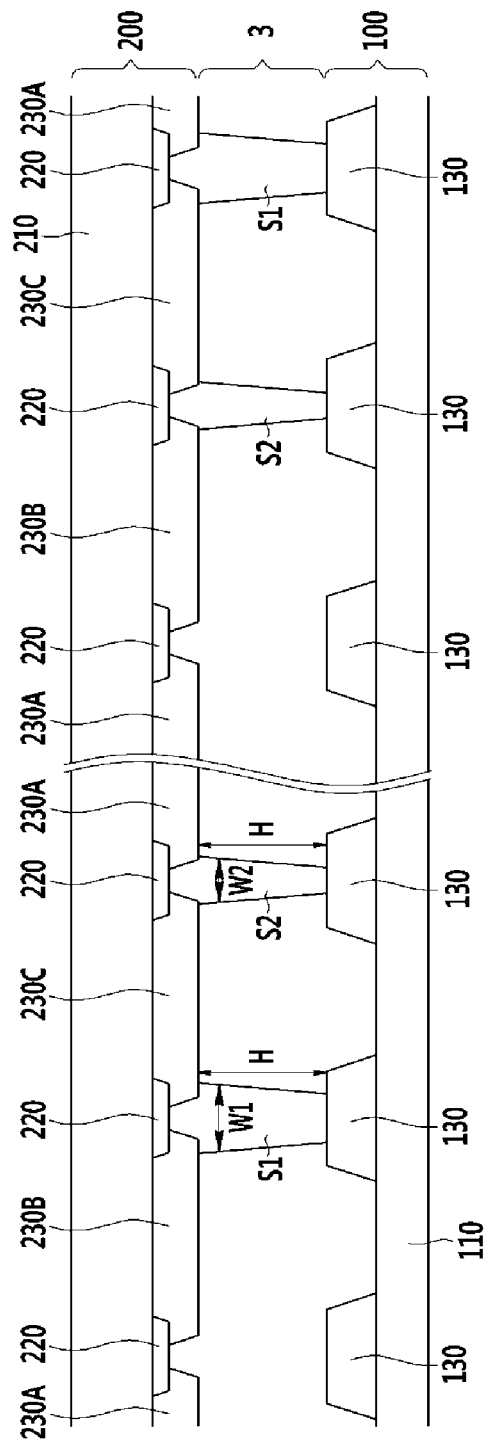
FIG. 19 is a schematic cross-sectional view of a liquid crystal display according to exemplary embodiments of the present invention.

Referring to FIG. 19, the liquid crystal display according to another exemplary embodiment of the present invention will be described. FIG. 19 is a schematic cross-sectional view of a liquid crystal display according to exemplary embodiments of the present invention.

The liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers 130 which may be disposed on the first substrate 110.

The second display panel 200 may include a second substrate 210, a light blocking member 220 may be disposed on the second substrate 210, and a plurality of color filters 230A, 230B, and 230C may be disposed on the light blocking member 220 and may filter light at different wavelengths corresponding to display different colors. The color filters may display one of the primary colors. Examples of the primary colors include primary colors such as red, green, and blue, or yellow, cyan, or magenta. Although not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 having different pressure tolerances. The first spacer S1 has larger pressure tolerance than the second spacer S2. Therefore, the first spacer S1 mainly maintains the cell gap of the liquid crystal display and the second spacer S2 may serve to supportively maintain the cell gap of the liquid crystal display when a force with a larger pressure than the pressure tolerance of the first spacer S1 may be applied to the liquid crystal display. The second spacer S2 may have smaller pressure tolerance than the first spacer S1, but have larger disposition density per pixel area.

In the exemplary embodiments, the first spacer S1 and the second spacer S2 may have different widths. The width W1 of the first spacer S1 is larger than the width W2 of the second spacer S2. Further, the first spacer S1 and the second spacer S2 have almost the same height H. As described above, the spacers that have the same height but different widths may have different pressure tolerances.

The first spacer S1 and the second spacer S2 may be disposed in two of a position corresponding to the first color filter 230A and the second color filter 230B of the plurality of color filters 230A, 230B, and 230C filtering light at different wavelengths corresponding to different colors and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A.

Although not shown in the drawings, a third spacer that has lower pressure tolerance than the first spacer S1 and the second spacer S2 may further be provided. The third spacer may be disposed so as to overlap at least two of a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A. The third spacer may have a smaller cross-sectional area than the first spacer S1 and the second spacer S2. The third spacer may have smaller pressure tolerance than the first spacer S1 and the second spacer S2, may have larger disposition density per pixel area.

However, the third spacer may have almost the same height as the second spacer S2, but may have a different width or cross-sectional area from the second spacer S2.

The first spacer, the second spacer, and the third spacer may have different disposition density. An area of the uppermost part may be approximately 3.40 to 6.17% with respect to the area of the uppermost part occupied by the entire spacers. The uppermost part may refer to a surface which may be closest to a substrate opposite to a substrate on which the first spacer S1 is located. The area of the uppermost part of the second spacer S2 may be approximately 4.44 to 9.02% with respect to the area of the uppermost part occupied by the entire spacers. The area of the uppermost part of the third spacer may be approximately 89.70 to 96.63% with respect to the area of the uppermost part occupied by the entire spacers.

Further, as the size of the liquid crystal display is increased, the disposition density of the first spacer may be relatively decreased, and the disposition density of the third spacer may be relatively increased.

According to the exemplary embodiments, it is disclosed that the first spacer S1 and the second spacer S2 may have different pressure tolerance caused by the different cross-sectional area. But, in the liquid crystal display according to another exemplary embodiment of the present invention, the first spacer S1, the second spacer S2, and the third spacer may have different cross-sectional shapes. For example, as the cross-sectional shape of the spacer may be changed to circle, polygon, oval, or quadrangle, the pressure tolerance of the spacers may be varied. Further, if the pressure tolerance may be varied, a cross-sectional shape correspondingly be changed.

Further, according to the exemplary embodiments of the present invention, the first spacer S1 may be disposed so as to correspond to two of a position corresponding to the first color filter 230A and the second color filter 230B of the plurality of color filters 230A, 230B, and 230C and the light blocking member 220 between the two color filters 230A and 230B, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A. The second spacer S2 may be disposed so as to correspond to any one of a position corresponding to the first color filter 230A and the second color filter 230B of the plurality of color filters 230A, 230B, and 230C and the light blocking member 220 between the two color filters 230A and 230B plurality of color filters 230A, a position corresponding to the second color filter 230B and the third color filter 230C of the plurality of color filters 230A, 230B, and 230C and the light blocking member 220 between the two color filters 230B and 230C, and a position corresponding to the third color filter 230C and the first color filter 230A of the plurality of color filters 230A, 230B, and 230C and the light blocking member 220 between the two color filters 230C and 230A.

In the liquid crystal display according to the exemplary embodiments of the present invention, the spacers S1 and S2 may be disposed in the second display panel 200. However, in the liquid crystal display according to another exemplary embodiment of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, the liquid crystal display according to the exemplary embodiments of the present invention, the first spacer and the second spacer may be disposed in the plurality of pixel areas. Therefore, as compared with the liquid crystal display according to the prior art in which the first and second spacers are disposed only in one pixel area, the disposition density of the spacer per pixel area is lowered, which may prevent the pressure tolerance of the spacer from largely acting only on a specific pixel. As a result, the pressure tolerance of the spacers may be uniformly maintained for every pixel and may prevent the amount of dropping liquid crystal from being insufficient, and may prevent the light leakage may be caused by the insufficient liquid crystal.

Figure 20:
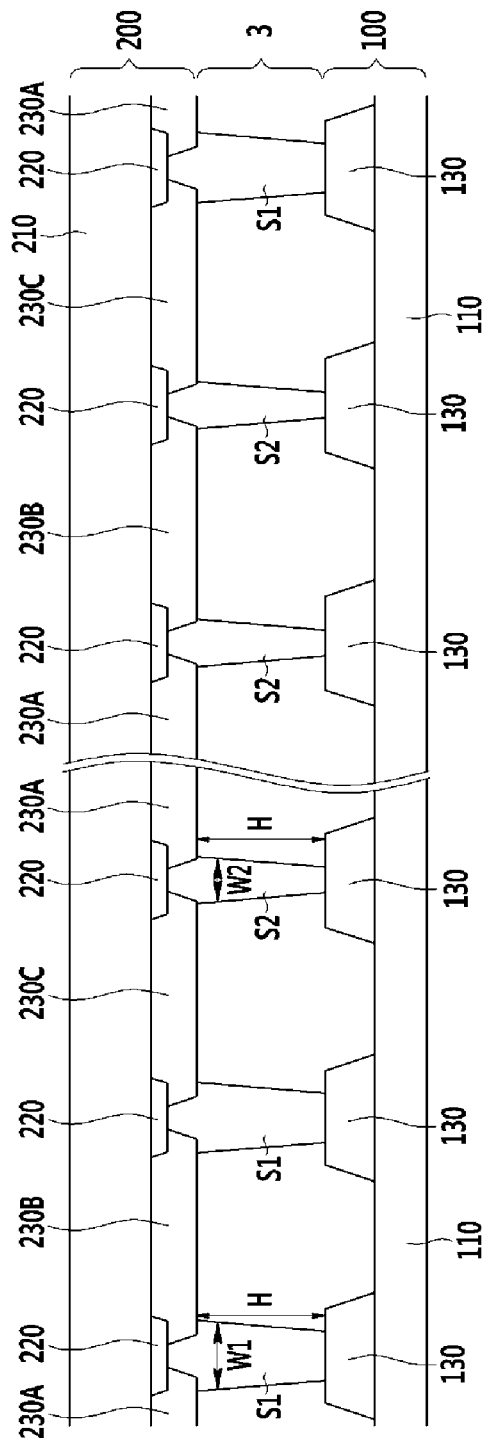
FIG. 20 is a schematic cross-sectional view of a liquid crystal display according to exemplary embodiments of the present invention.

Referring to FIG. 20, the liquid crystal display according to another exemplary embodiment of the present invention will be described. FIG. 20 is a schematic cross-sectional view of a liquid crystal display according to another exemplary embodiment of the present invention.

Referring to FIG. 20, the liquid crystal display according to the exemplary embodiments of the present invention may include a first display panel 100 and a second display panel 200 which may face each other and a liquid crystal layer 3 may be injected between the two display panels 100 and 200.

The first display panel 100 may include a first substrate 110, and a plurality of thin film layers 130 may be disposed on the first substrate 110.

The second display panel 200 may include a second substrate 210, a light blocking member 220 may be disposed on the second substrate 210, and a plurality of color filters 230A, 230B, and 230C may be disposed on the light blocking member 220 and may display different colors. The color filters may filter light at different wavelengths corresponding to primary colors. Examples of the primary colors may include primary colors such as red, green, and blue, or yellow, cyan, or magenta. Even though not shown in the drawings, the color filter may further include color filters that filter light at different wavelengths corresponding to a display of a mixture of the primary colors or colors other than the primary colors.

A plurality of spacers S1 and S2 may be disposed between the first display panel 100 and the second display panel 200. The spacers S1 and S2 may include a first spacer S1 and a second spacer S2 may have different pressure tolerances. The first spacer S1 may have larger pressure tolerance than the second spacer S2. Therefore, the first spacer S1 may maintain the cell gap of the liquid crystal display and the second spacer S2 may serve to supportively maintain the cell gap of the liquid crystal display when a force with a larger pressure than the pressure tolerance of the first spacer S1 may be applied to the liquid crystal display. The second spacer S2 may have smaller pressure tolerance than the first spacer S1, but have a higher disposition density per pixel area.

In the exemplary embodiments, the first spacer S1 and the second spacer S2 may have different widths. The width W1 of the first spacer S1 may be larger than the width W2 of the second spacer S2. Further, the first spacer S1 and the second spacer S2 may have almost the same height H. As described above, the spacers which may have the same height, but different widths may have different pressure tolerances.

The first spacer S1 and the second spacer S2 may be disposed in a position which may correspond to the first color filter 230A and the second color filter 230B of the plurality of color filters 230A, 230B, and 230C filtering light at different wavelengths corresponding to different colors and the light blocking member 220 between the two color filters 230A and 230B, a position which may correspond to the second color filter 230B and the third color filter 230C of the plurality of color filters 230A, 230B, and 230C and the light blocking member 220 between the two color filters 230B and 230C, and a position which may correspond to the third color filter 230C and the first color filter 230A of the plurality of color filters 230A, 230B, and 230C and the light blocking member 220 between the two color filters 230C and 230A.

Even though not shown in the drawings, a third spacer which may have lower pressure tolerance than the first spacer S1 and the second spacer S2 may further be provided. The third spacer may be disposed which may overlap a position which may correspond to the first color filter 230A and the second color filter 230B of the plurality of color filters 230A, 230B, and 230C and the light blocking member 220 between the two color filters 230A and 230B, a position which may correspond to the second color filter 230B and the third color filter 230C of the plurality of color filters 230A, 230B, and 230C and the light blocking member 220 between the two color filters 230B and 230C, and a position which may correspond to the third color filter 230C and the first color filter 230A of the plurality of color filters 230A, 230B, and 230C and the light blocking member 220 between the two color filters 230C and 230A. The third spacer may have a smaller cross-sectional area than the first spacer S1 and the second spacer S2. The third spacer may have smaller pressure tolerance than the first spacer S1 and the second spacer S2, but may have larger disposition density per pixel area.

However, the third spacer may have almost the same height as the second spacer S2, but a different width or cross-sectional area from the second spacer S2.

The first spacer, the second spacer, and the third spacer may have different disposition density. The area of a surface (hereinafter, referred to as the area of the uppermost part) which may be closest to a substrate corresponding to a substrate on which the first spacer S1 may be formed may be approximately 3.40 to 6.17% with respect to the area of the uppermost part occupied by the entire spacers. The area of the uppermost part of the second spacer S2 may be approximately 4.44 to 9.02% with respect to the area of the uppermost part occupied by the entire spacers. The area of the uppermost part of the third spacer may be approximately 89.70 to 96.63% with respect to the area of the uppermost part occupied by the entire spacers.

Further, as the size of the liquid crystal display may be increased, the disposition density of the first spacer may relatively be decreased, and the disposition density of the third spacer may relatively be increased.

According to the exemplary embodiments, it is disclosed that the first spacer S1 and the second spacer S2 may have different pressure tolerance caused by the different cross-sectional area. But, in the liquid crystal display according to another exemplary embodiment of the present invention, the first spacer S1, the second spacer S2, and the third spacer may have different cross-sectional shapes. For example, as the cross-sectional shape of the spacer may be changed to circle, polygon, oval, or quadrangle, the pressure tolerance of the spacers may be varied. Further, if the pressure tolerance may be varied, a cross-sectional shape may correspondingly be changed.

In the liquid crystal display according to the exemplary embodiments of the present invention, the spacers S1 and S2 may be disposed in the second display panel 200. However, in the liquid crystal display according to another exemplary embodiment of the present invention, the spacers may be disposed on the first display panel 100. When the spacers and the color filters are disposed on the first display panel 100, the spacers overlap the light blocking member disposed on the second display panel 200. When the light blocking member is also disposed on the first display panel 100, the spacers overlap a transparent electrode or the second substrate 210 of the second display panel 200. Further, the color filters and the spacers may be disposed on different display panels. When the spacers are disposed on the first display panel 100 and the color filters are disposed on the second display panel 200, the spacers overlap the light blocking member or the color filters disposed on the second display panel 200.

As described above, the liquid crystal display according to the exemplary embodiments of the present invention, the first spacer and the second spacer may be disposed in the plurality of pixel areas. Therefore, as compared with the liquid crystal display according to the prior art in which the first and second spacers are disposed only in one pixel area, the disposition density of the spacer per pixel area may be lowered, which may prevent the pressure tolerance of the spacer from largely acting only on a specific pixel. As a result, the pressure tolerance of the spacers may uniformly be maintained for every pixel and may prevent the amount of dropping liquid crystal from being insufficient, and may prevent the light leakage may be caused by the insufficient liquid crystal.

Figure 21:
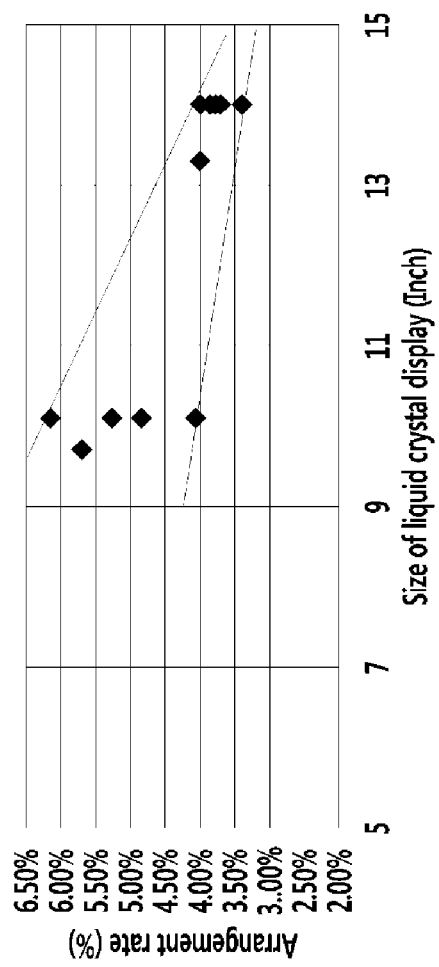
FIG. 21 and FIG. 22 are graphs showing disposition density of a spacer depending on the size of a liquid crystal display according to experimental exemplary embodiments of the present invention.
Figure 22:
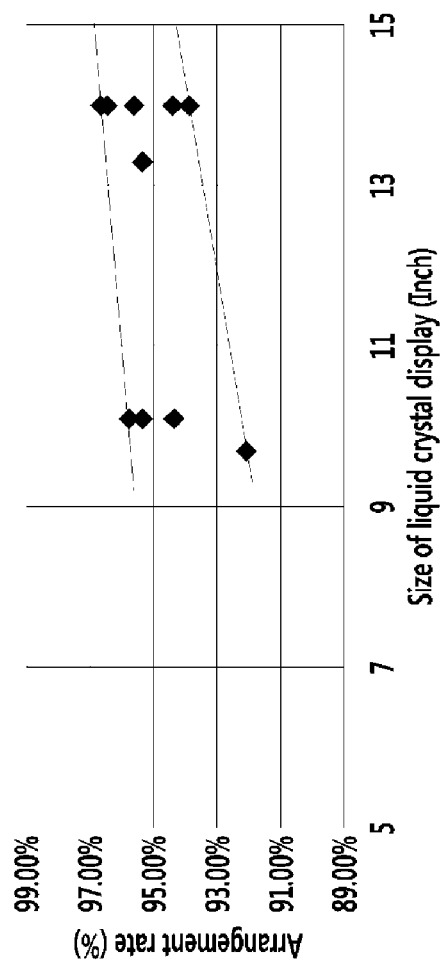

Referring to FIG. 21 and FIG. 22, the disposition density of the spacer depending on the size of the liquid crystal display according to the experimental example of the present invention will be described. FIGS. 21 and 22 are graphs showing the disposition density of a spacer depending on the size of a liquid crystal display according to experimental exemplary embodiments of the present invention.

In this experimental example, while the size of the liquid crystal display may be changed, the first to third spacers may be formed as in the liquid crystal display according to the exemplary embodiments of the present invention. Further, the liquid crystal displays may be prepared such that the pressure tolerance of the spacer may uniformly be maintained for every pixel. Therefore, the leakage of light caused by the insufficient of liquid crystal may be prevented by preventing the amount of dropping liquid crystal from being insufficient. Under this condition, the ratio of the spacers of each liquid crystal display was measured. In this experimental example, the liquid crystal displays were prepared 13 times while the size of liquid crystal displays is changed. In each case, the area of a surface (referred to as the area of the uppermost part) that is the closest to a substrate corresponding to a surface on which the spacer is formed was measured. The ratio of the area of the uppermost part of each spacer with respect to the area of the uppermost part of the entire spacers was depicted in the graph. FIG. 21 is a graph showing the disposition density of the first spacer S1 according to the size of the liquid crystal display, and FIG. 22 is a graph showing the disposition density of the third spacer according to the size of the liquid crystal display. In each graph, X-axis represents the size of the liquid crystal display measured in inch.

Referring to FIG. 21 and FIG. 22, it can be understood that if the area of the uppermost part of the first spacer S1 is approximately 3.40 to 6.17% with respect to the area of the uppermost part occupied by the entire spacers and the area of the uppermost part of the third spacer is 89.70 to 96.63% with respect to the area of the uppermost part occupied by the entire spacers, the pressure tolerance of the spacer can be uniformly maintained for every pixel, such that it is possible to prevent the amount of dropping liquid crystal from being insufficient, which results in preventing the light leakage caused by the insufficient liquid crystal. Further, it can be understood that as the size of the liquid crystal display is increased, the disposition density of the first spacer is relatively decreased, and the disposition density of the third spacer is relatively increased.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a first substrate and a second substrate facing each other;
a plurality of color filters disposed on the second substrate and comprising a first color filter, a second color filter, and a third color filter configured to filter different wavelengths corresponding to colors; and
a plurality of first spacers and a plurality of second spacers disposed on the second substrate, distances from distal ends of the plurality of first spacers to an upper surface of a plurality of thin films formed on the first substrate being different from distances from distal ends of the plurality of second spacers to the upper surface of the plurality of thin films formed on the first substrate and the plurality of first spacers having different widths or cross-sectional areas from the plurality of second spacers,
wherein the plurality of first spacers is disposed in positions overlapping each of the first color filter, the second color filter, and the third color filter,
wherein the plurality of second spacers is disposed in positions overlapping each of the first color filter, the second color filter, and the third color filter, and
wherein the distal ends of the plurality of first spacers and the distal ends of the plurality of second spacers are each disposed directly facing the upper surface of corresponding thin films of the plurality of thin films.

2. The liquid crystal display of claim 1, wherein:
a height of each of the first spacers of the plurality of first spacers is different from a height of each of the second spacers of the plurality of second spacers.

3. The liquid crystal display of claim 1, wherein:
a height of the plurality of thin films disposed on the first substrate corresponding to each of the first spacers of the plurality of first spacers is different from a height of the plurality of thin films disposed on the first substrate corresponding each of to the second spacers of the plurality of second spacers.

4. The liquid crystal display of claim 3, wherein:
the height of each of the first spacers of the plurality of first spacers is substantially equal to the height of each of the second spacers of the plurality of second spacers.

5. The liquid crystal display of claim 3, wherein:
the height of each of the first spacers of the plurality of first spacers is different from the height of each of the second spacers of the plurality of second spacers.

6. The liquid crystal display of claim 1, further comprising:
a third spacer disposed on the second substrate, a distance between the third spacer and the upper surface of the plurality of thin films disposed on the first substrate is different from a distance between the upper surface of the plurality of thin films and each of the first spacers of the plurality of first spacers and each of the second spacers of the plurality of second spacers, respectively.

7. The liquid crystal display of claim 6, wherein:
the third spacer is disposed in a position to overlap each of at least two color filters.

8. The liquid crystal display of claim 6, wherein:
the distance between each of the first spacers of the plurality of first spacers and the upper surface of the plurality of thin films disposed on the first substrate is smaller than the distance between each of the second spacers and the upper surface of the plurality of thin films disposed on the first substrate,
the distance between each of the second spacers of the plurality of second spacers and the upper surface of the plurality of thin films disposed on the first substrate is smaller than the distance between the third spacer and the upper surface of the plurality of thin films disposed on the first substrate, and
a difference in the distance between the third spacer and the upper surface of the plurality of thin films disposed on the first substrate and the distance between each of the first spacers of the plurality of first spacers and the upper surface of the plurality of thin films disposed on the first substrate is approximately 0.6 µm to 1.5 µm.

9. The liquid crystal display of claim 1, further comprising:
a third spacer disposed on the second substrate, the third spacer having substantially the same height as each of the second spacers of the plurality of second spacers, and a different width or cross-sectional area than each of the second spacers of the plurality of second spacers.

10. The liquid crystal display of claim 9, wherein:
the third spacer is disposed in a position to overlap each of at least two color filters.

11. The liquid crystal display of claim 1, wherein:
each of the first spacers of the plurality of first spacers has a different cross-sectional shape than that of each of the second spacers of the plurality of second spacers.

12. The liquid crystal display of claim 1, further comprising:
a third spacer disposed on the second substrate, the third spacer having a different cross-sectional area from each of the first spacers of the plurality of first spacers and each of the second spacers of the plurality of second spacers.

13. The liquid crystal display of claim 12, wherein:
a height of the third spacer is substantially equal to a height of each of the second spacers of the plurality of second spacers.

14. The liquid crystal display of claim 12, wherein:
the third spacer is disposed in a position to overlap each of at least two color filters.

15. A liquid crystal display, comprising:
a first substrate and a second substrate facing each other;
a first color filter, a second color filter, and a third color filter disposed on the second substrate configured to filter different wavelengths corresponding to different colors; and
a plurality of first spacers and a plurality of second spacers disposed on the second substrate, the first spacers and the second spacers having different gaps from an upper surface of the plurality of thin films disposed on the first substrate or different widths or cross-sectional shapes,
wherein the plurality of first spacers and the plurality of second spacers are disposed in positions overlapping the first color filter and the second color filter, positions overlapping the second color filter and the third color filter, and positions overlapping the third color filter and the first color filter, and
wherein distal ends of the plurality of first spacers and distal ends of the plurality of second spacers are each disposed directly facing the upper surface of corresponding thin films of the plurality of thin films.

16. The liquid crystal display of claim 15, wherein:
a height of each of the first spacers of the plurality of first spacers is different from a height of each of the second spacers of the plurality of second spacers.

17. The liquid crystal display of claim 15, wherein:
a height of the plurality of thin films disposed on the first substrate corresponding to each of the first spacers of the plurality of first spacers is different from a height of the plurality of thin films disposed on the first substrate corresponding to each of the second spacers.

18. The liquid crystal display of claim 17, wherein:
a height of each of the first spacers of the plurality of first spacers is substantially equal to a height of each of the second spacers of the plurality of second spacers.

19. The liquid crystal display of claim 17, wherein:
a height of each of the first spacers of the plurality of first spacers is different from a height of each of the second spacers of the plurality of second spacers.

20. The liquid crystal display of claim 15, further comprising:
a third spacer disposed on the second substrate a distance between the third spacer and the upper surface of the plurality of thin films disposed on the first substrate being different from a distance between the upper surface of the plurality of thin films and each of the first spacers of the plurality of first spacers and each of the second spacers of the plurality of second spacers respectively.

21. The liquid crystal display of claim 20, wherein:
the third spacer is disposed in at least two positions of a position overlapping the first color filter and the second color filter, a position overlapping the second color filter and the third color filter, and a position overlapping the third color filter and the first color filter.

22. The liquid crystal display of claim 20, wherein:
the distance between each of the first spacers of the plurality of first spacers and the upper surface of the plurality of thin films disposed on the first substrate is smaller than the distance between each of the second spacers of the plurality of second spacers and the upper surface of the plurality of thin films disposed on the first substrate,
the distance between each of the second spacers of the plurality of second spacers and the upper surface of the plurality of thin films disposed on the first substrate is smaller than the distance between the third spacer and the upper surface of the plurality of thin films disposed on the first substrate, and
a difference in the distance between the third spacer and the upper surface of the plurality of thin films disposed on the first substrate and the distance between each of the first spacers of the plurality of first spacers and the upper surface of the plurality of thin films disposed on the first substrate is approximately 0.6 µm to 1.5 µm.

23. The liquid crystal display of claim 15, further comprising:
a third spacer disposed on the second substrate, the third spacer having the same height as each of the second spacers of the plurality of second spacers, and a different width or cross-sectional area than each of the second spacers of the plurality of second spacers.

24. The liquid crystal display of claim 23, wherein:

the third spacer is disposed in at least two positions of a position overlapping the first color filter and the second color filter, a position overlapping the second color filter and the third color filter, and a position overlapping the third color filter and the first color filter.

25. The liquid crystal display of claim 15, wherein:

the plurality of first spacers and the plurality of second spacers are disposed in positions overlapping the first color filter and the second color filter and a light blocking member between the first color filter and the second color filter, positions overlapping the second color filter and the third color filter and a light blocking member between the second color filter and the third color filter, and positions overlapping the third color filter and the first color filter and a light blocking member between the third color filter and the first color filter.

26. The liquid crystal display of claim 15, wherein:

each of the first spacers of the plurality of first spacers has a different cross-sectional shape from that of each of the second spacers of the plurality of second spacers.

27. The liquid crystal display of claim 15, further comprising:

a third spacer disposed on the second substrate, having a different cross-sectional area from each of the first spacers of the plurality of first spacers and each of the second spacers of the plurality of second spacers.

28. The liquid crystal display of claim 27, wherein:

a height of the third spacer is substantially equal to a height of each of the second spacers of the plurality of second spacers.

29. The liquid crystal display of claim 27, wherein:

the third spacer is disposed in at least two positions of a position overlapping the first color filter and the second color filter, a position overlapping the second color filter and the third color filter, and a position overlapping the third color filter and the first color filter.

* * * * *